United States Patent [19]

Kronfeld

[11] Patent Number: 4,537,509

[45] Date of Patent: Aug. 27, 1985

[54] OPTICAL INSPECTION AND ALIGNMENT VERIFICATION SYSTEM

[75] Inventor: Leonard E. Kronfeld, Minneapolis, Minn.

[73] Assignee: Nortronics Company, Inc., Minneapolis, Minn.

[21] Appl. No.: 356,328

[22] Filed: Mar. 10, 1982

[51] Int. Cl.³ .............................................. G01B 11/00
[52] U.S. Cl. .................................. 356/399; 356/375; 33/276
[58] Field of Search ............... 356/237, 394, 399, 400, 356/401, 375; 33/276, 180 R; 350/512

[56] References Cited

U.S. PATENT DOCUMENTS

| | | | |
|---|---|---|---|
| 2,247,113 | 6/1941 | Benford | 356/399 |
| 2,327,257 | 8/1943 | Gary et al. | 356/394 |
| 3,052,974 | 9/1962 | Williams | 356/399 |
| 3,355,979 | 12/1967 | Wirtanen | 356/399 |

FOREIGN PATENT DOCUMENTS 609536 10/1948 United Kingdom ............... 356/375

*Primary Examiner*—R. A. Rosenberger

*Attorney, Agent, or Firm*—Merchant, Gould, Smith, Edell, Welter & Schmidt

[57] ABSTRACT

An optical inspection system includes a thin optical probe having spaced parallel viewing surfaces on opposite sides and image reflecting elements within for transmitting images from the viewing surfaces to viewing optics including optical paths aligned with the edge of the probe to receive and magnify images from the viewing surfaces. The apparatus permits insertion of the probe for inspection and measurement of areas not readily accessible by conventional means. The probe is preferably used as part of a system and method for optical alignment verification of double sided floppy disk transducer head assemblies, wherein the probe is inserted between the heads, with their read/write gaps adjacent the viewing surfaces. Measurement apparatus is provided to permit measurement of the relative positions of the read/write gaps for the two heads. An optical tracking scope is provided for measuring any movements of a transducer mounted on a lift arm of a transducer assembly that are caused by lifting the arm wider than normal operating position to accept the thickness of the optic probe. The induced movements can then be compensated for in the calculation of head alignment.

14 Claims, 23 Drawing Figures

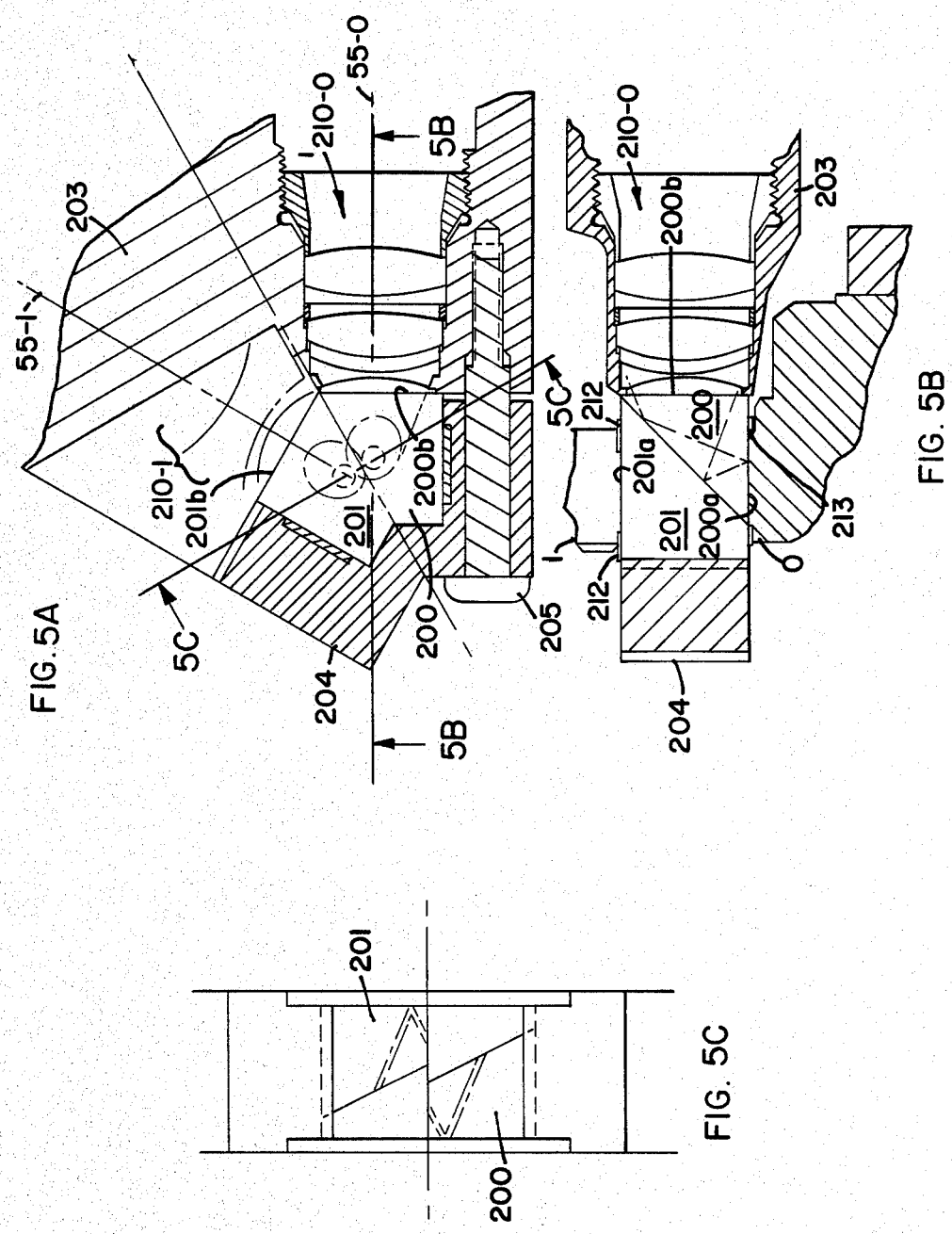

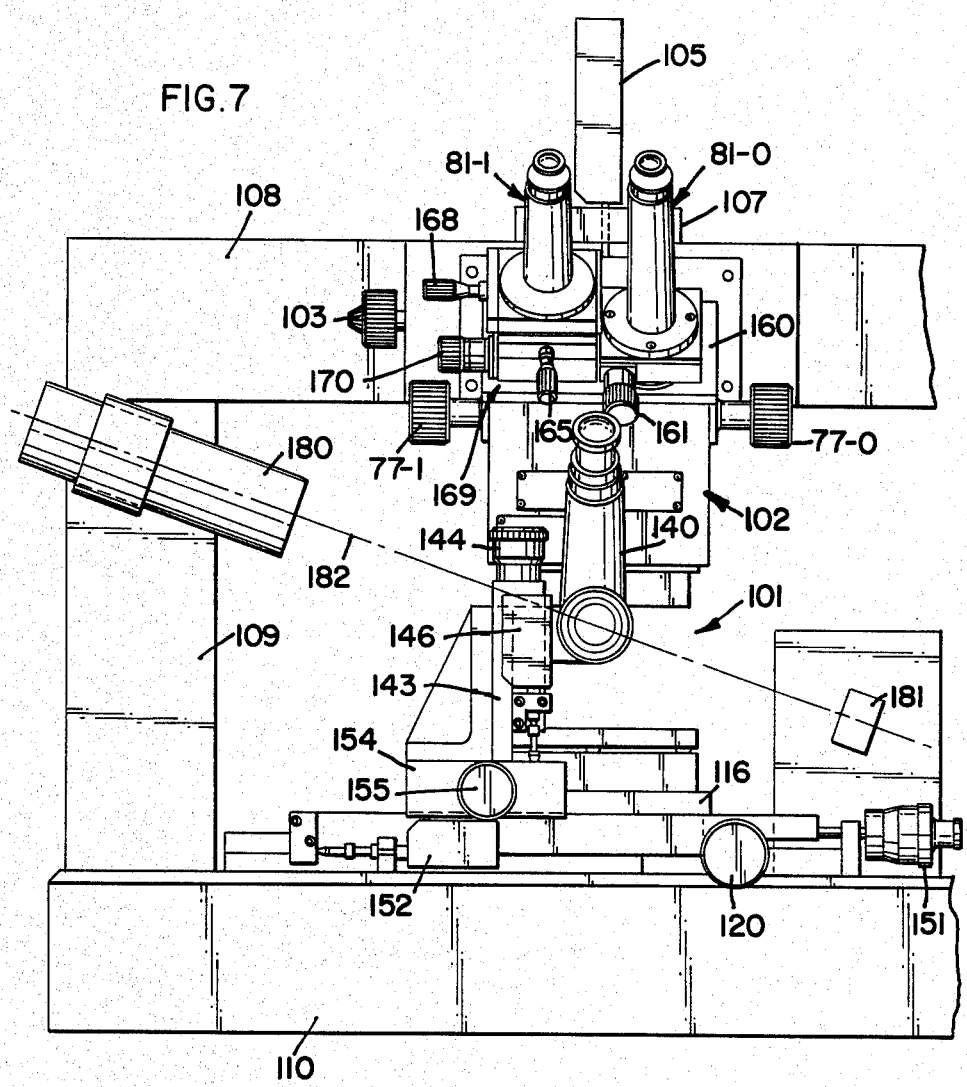

FIG. 12
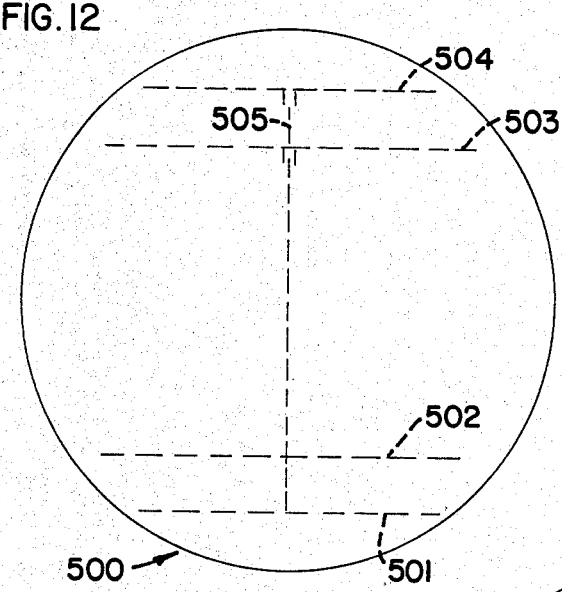
FIG. 13
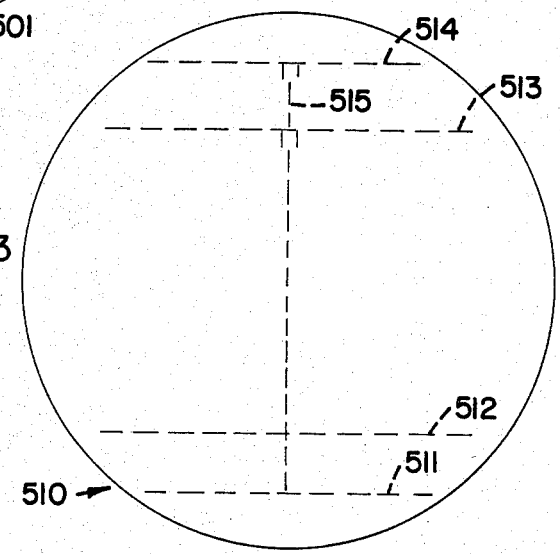
FIG. 14a
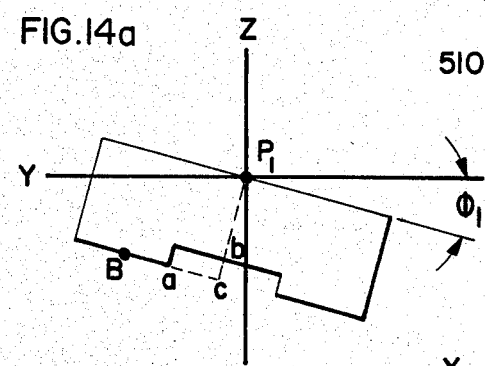
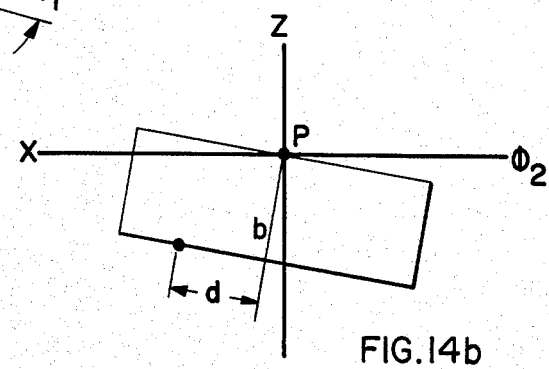
FIG. 14b

OPTICAL INSPECTION AND ALIGNMENT VERIFICATION SYSTEM

TECHNICAL FIELD OF THE INVENTION

The invention pertains to the field of optical equipment for the inspection of small objects or surfaces, and in particular inspection of objects or surfaces which cannot be inspected by conventional optical equipment because their position within a machine or assembly results in a partially or totally obstructed angle of view for conventional microscopes and the like. The invention is particularly adapted for verification of the alignment of magnetic transducers of a head assembly for use with double sided floppy disks.

BACKGROUND OF THE PRIOR ART

Optical equipment including microscopes and specially designed magnifying devices have been widely used for inspection of small objects in a wide variety of industrial applications. In some cases they are used to permit inspection of small parts to see that they are free of scratches or other defects. In other cases optical magnification systems are used to verify certain critical dimensions of a manufactured part by magnification and comparison against a standard reticle or template. A common requirement for conventional microscope and optical comparator inspection systems is that there must be a direct, unobstructed optical line of sight to the object to be inspected, and more specifically to the particular surface of the object which is to be inspected. In the case of inspection of small manufactured parts, this ordinarily presents no problem as they can be positioned by hand or by suitable mechanical manipulators as desired within the field of view of the optical apparatus. However, if it is desired to inspect a surface or a part of an assembly, this can impose difficulties that rule out the use of conventional optical inspection techniques, if the part to be inspected is "buried" within the assembly, or if direct view of the part or surface in question is blocked by another part of the assembly.

An example is in the field of transducer head assemblies for flexible magnetic disk data storage systems. The so-called "floppy disk" media has recently found wide usage in a great variety of program and data storage applications for digital computer systems. The floppy disk media is a thin, generally planar flexible or pliant disk having magnetically sensitive surfaces and currently rotatable at speeds of approximately 360 rpm within a protective envelope or jacket cover. Data transfer to and from the floppy disk is achieved by one or more electromagnetic heads arranged within a transducer assembly. Both single sided and double sided floppy disk systems are currently in use. As the name implies, a single sided system makes use of a magnetic coating on only one side of the rotating flexible disk media with data transfer being accomplished by a single magnetic transducer brought into contact with the disk. In the case of a double sided floppy disk system, magnetic coatings on both sides of the flexible disk media are used covered with a magnetic coating, and a transducer assembly having a pair of magnetic heads is used for data transfer to both sides of the disk, with the heads positioned on either side of the disk, which is sandwiched between the heads. Double sided floppy disk systems offer advantages over single sided systems where data storage density and maximum data transfer rate considerations are important.

Transducers responsible for the electromagnetic transfer of data to and from the magnetic floppy disk generally comprise a plurality of magnetic core members interconnected and secured together to define the magnetic circuitry and having one or more coils. Generally the transducer structures used in association with data transfer to and from a floppy disk comprise a single channel read/write head, and may typically also include an erase head. The erase head generally comprises a plurality of erase cores for trimming a "track" of information written onto the floppy disk surface by the read/write head, and for erasing a pair of guard-band areas on each side of the trimmed track. Particular structural details and relative placement of the electromagnetic components which collectively comprise the various head portions of an electromagnetic transducer can vary from one design to another. However, all such head assemblies have a read/write head, and more particularly a read/write gap which must be positioned accurately with respect to the tracks of data on the disk.

In the case of a single-sided system, the transducer assembly is typically mounted upon a movable carriage structure which is radially indexed with respect to the floppy disk. Movement of the carriage structure enables the transducer carried thereby to access different desired circular "tracks" located at different radial positions on the magnetizable surface of the floppy disk. In the manufacture of a floppy disk data storage device, it is necessary that the read/write gap of the head be accurately possitioned within the carriage for compatibility with the defined data tracks on the disk, Positioning of the read/write gap can be specified in terms of three rectangular coordinate directions X, Y, and Z and an aximuth angle, with respect to defined reference positions and planes on the carriage.

In the prior art, optical techniques have been used for verification of the alignment, i.e. positioning, of the read/write gap for a single sided floppy disk head assembly. The transducer carriage is placed in a suitable holding in conjunction with a microscope-type viewing device which is aligned to look in a direction normal to the face of the transducer. The viewing device permits measurements of the actual position and azimuth of the read/write gap for comparison against a manufacturing tolerance.

Unfortunately however, optical verification techniques used successfully for verifying tansducer assemblies for single sided floppy disks cannot be used for double sided floppy disk head assemblies. In a double sided floppy disk system, a pair of transducers are provided, and they are mounted in a transducer assembly designed to position the heads for operative engagement of opposite surfaces or sides of the floppy disk, in generally opposed relationship to one another. The opposed transducers are positioned such that their respective head gaps are slightly radially offset relative to one another, in accordance with a specific industry standard, for minimizing magnetic flux interaction between the transducers.

In double sided floppy disk systems, the X, Y, Z, and azimuth positioning of the head gaps must be maintained within specified narrow tolerances with refernce to the carriage, or in the case of the "upper" core track centerline, with reference to the "lower" core track centerline. An optical inspection apparatus of the type used for verifying alignment of a single sided floppy disk head assembly cannot be used because there is no direct optical access or unobstructed direction of view for the faces of the transducers. Since the transducers face each other in operative position, each transducer blocks the view to the face of the other.

Various techniques are employed in industry for assembling and aligning the individual heads to the carriage, support arm, etc. at positions calculated to bring them into correct alignment after final assembly of the entire transducer head assembly. However, despite the care taken in alignment during the manufacturing process, there is still a need for direct verification of alignment of a completed unit in the final operative assembly according to the engineering specifications for the assembly.

The need for verifying alignment of the heads of a double sided floppy disk head assembly arises at several different times. At the completion of the manufacturing process for the head assembly, and prior to mating the head assembly to the disk drive, it is advantageous to verify head alignment in order to avoid difficulties later. This is particularly true in the case where the head assembly is built by a different company, or at a different facility, from the manufacture of the disk drive, as is the custom in the industry today. In such cases, the head manufacturer typically will test alignment of each head assembly prior to shipping, and the disk drive manufacturer will typically re-test the head assemblies on incoming acceptance testing before mating them with disk drives. Also, should trouble be encountered with the operation of a completed floppy disk data storage unit, there would be a need to once again check head alignment.

At present, all verification of double sided floppy disk head alignment is done by observing the electrical output of the heads while playing back from a standardized prerecorded disk, such as a "Dysan" or other reference diskette. A number of problems are inherent with this type of test. One problem is the quality and accuracy of the reference diskette itself. Since the Dysan diskette is made by writing the test tracks onto the diskette through the use of a head assembly, the accuracy of alignment of the heads used to make the Dysan diskette are critical, and there may not be an independent way of verifying that alignment.

A second problem area is the mounting of the head assembly carriage to a disk drive mechanism, which is necessary for running the test. Even if the heads were perfectly aligned to reference points on the head assembly carriage in accordance with an engineering specification, if there were errors in the mounting of the carriage to the disk drive, the heads could be misplaced with respect to the tracks on the reference diskette. The Dysan or reference diskette test is thus a test of the particular head assembly/disk drive combination, and not a test of the intrinsic alignment of the head assembly itself according to the written specification therefor.

A related problem is that because it is necessary to mount the head assembly to a disk drive before any measurement can be made, discrepancies in the disk drives used for separate tests of the same head assembly might fail to give repeatable results. This is particularly troublesome where the same head assembly is tested successively at the final quality control check at the head manufacturer's facility, and again at the incoming inspection at the disk drive manufacturer's facility, with different results for the two tests.

To solve these and other problems, the present invention provides apparatus that permits optical inspection and verification of alignment of the heads in a double sided floppy disk head assembly, that is not dependent upon characteristics of the disk drive mechanism. The optical verification system is not limited to a single specific head design, but is applicable to a wide variety of head assembly designs.

SUMMARY OF THE INVENTION

According to the present invention there is provided an optical instrument having a small objective probe that may be inserted into a small opening within the machine, assembly or object, to permit viewing and optical measurement of an object or surface whose position does not permit direct observation because of blocking of view by other components or parts of the machine, assembly or object.

The preferred form of the invention provides apparatus and a method especially adapted for optical alignment verification of double sided magnetic disk transducer assembly heads. The apparatus inclues an objective probe adapted for placement between the opposing heads of the assembly. The objective probe contains mirrors or prisms and objective lens assemblies that permit observation of the faces of both transducers. Further optics including eyepieces with reticles are provided to permit measurement of the head gap positions.

According to another aspect of the invention, a tracking scope is used in conjunction with the system for observing any movement of the head on the lift arm in a plane parallel to the nominal plane of the disk as the arm is lifted to receive the objective probe. This permits compensation for any induced alignment errors caused by movement of one of the heads apart from the other to receive the objective probe, which is thicker than a standard diskette.

The invention provides a method of measuring alignment of magnetic disk transducer assemblies of the type having a pair of opposed transducers. An optic probe is inserted between the transducers, having a pair of optical paths for viewing the respective opposing gaps of the transducers. Any relative displacement of the transducers in a plane parallel to the nominal plane of the disk is compensated for, preferably by direct observation and measurement of such displacement. The head assembly and probe are positioned to an known position relative to one another by observing the gap of one of the transducers through one of the optical paths. The position of the gap of the other of the transducers with respect to the known position is measured by observation thereof through the other optical path. The alignment of the two transducer gaps is then calculated by taking the difference between the measurement of position and the relative displacement caused by moving them apart to receive the probe.

BRIEF DESCRIPTION OF THE DRAWING

In the drawing,

FIG. 5a, 5b and 5c are enlarged sectional views of the optic probe 50 of the verification microscope of FIGS. 3 and 4, with FIGS. 5b and 5c taken along lines B—B and C—C, respectively of FIG. 5a;

FIGS. 7 and 8 are front and side views respectively of the alignment verification apparatus of the present invention;

FIGS. 12 and 13 are reticles for channels 0 and 1, respectively of the alignment verification apparatus of FIGS. 7 and 8;

FIGS. 14a and 14b are diagrams illustrating certain dimensions of a transducer mounted on the lift arm of a head assembly.

DETAILED DESCRIPTION OF THE PREFERRED EMBODIMENT

The optical inspection apparatus of the present invention is described in the following description and accompanying drawings in terms of the presently preferred embodiment adapted for verification of head alignment in double sided floppy disk head assemblies. However, the invention is not limited to a single application, but is applicable to a wide variety of optical inspection and verification applications.

Figure 1:
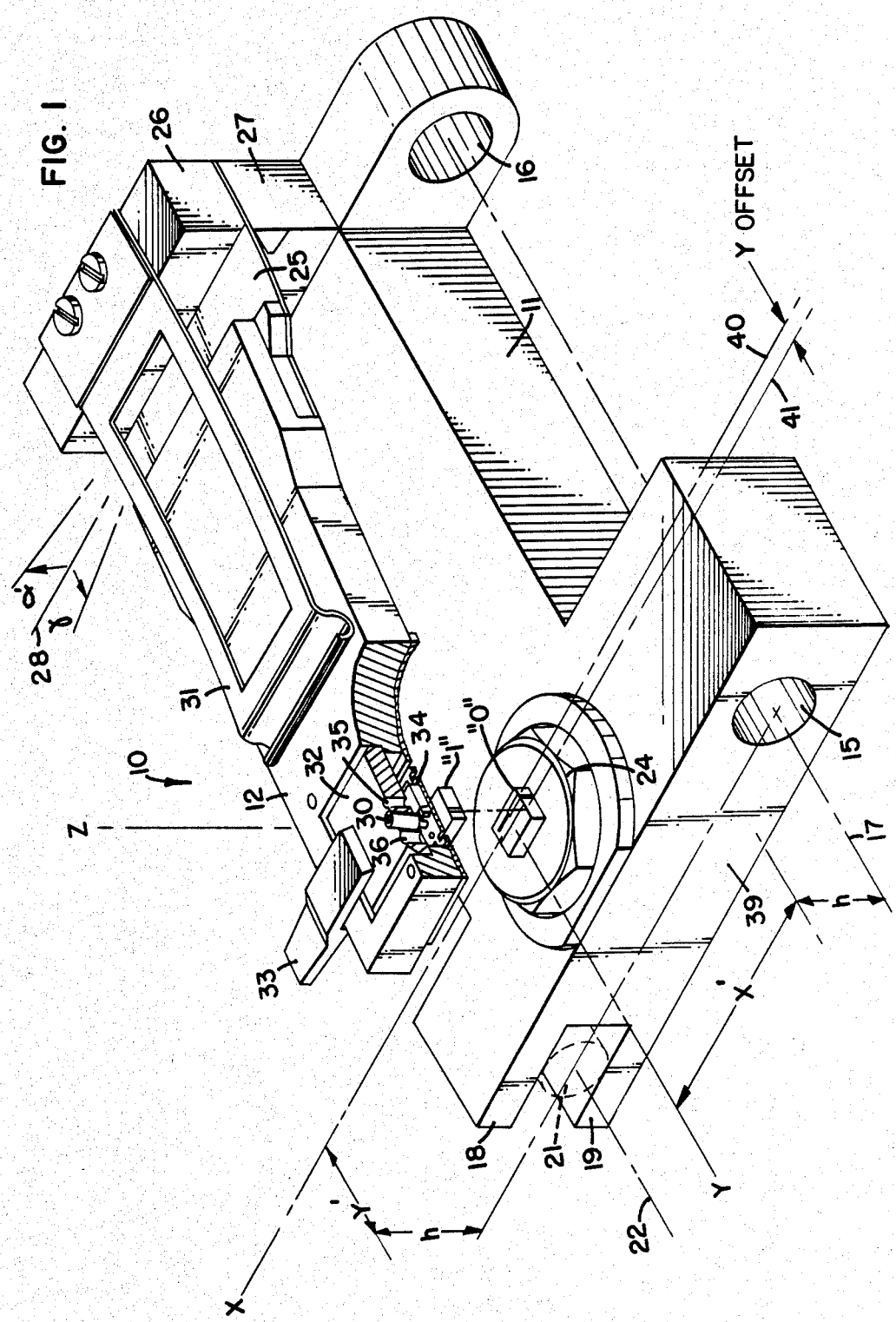
FIG. 1 is a diagrammatic view in perspective of a double sided floppy disk head assembly, portions thereof broken away for purposes of illustration, together with reference parameters therefor.

FIG. 1 illustrates in diagrammatic form the main components of a typical head assembly for a double sided floppy disk data storage system, with a portion thereof cut away for clarity of presentation. FIG. 1 also shows important alignment parameters for a double sided floppy disk head assembly which must be verified. In FIG. 1, reference number 10 generally designates the head assembly. Head assembly 10 includes a carriage 11 and a support arm 12. A pair of transducers, or "heads" are mounted on the carriage and support arm, respectively. The head mounted on the carriage is indicated by "0" and will be referred to herein as "head 0." The head mounted on the support arm is indicated by "1" and will be referred to as "head 1." The heads 0 and 1 consist of a number of magnetic pole pieces, ceramic pieces and coil windings as is generally known in the art, and therefore the details of construction are not shown.

Carriage 11 is a typical base support member designed not only to hold the other components of the head assembly, but also to mate with the disk drive unit to form a completed floppy disk data storage system. Carriage 11 has a pair of coaxial mounting holes 15 and 16 along one side, centered on the axis indicated by reference number 17. These holes are used to receive a guide rod of a lead screw mechanism, or other mechanism of the disk drive designed to hold the carriage and position it radially to bring the heads into alignment with different concentric tracks on the diskette. On the other side of the carriage, a pair of tab portions 18 and 19 define a space for receiving a further guide rod of the drive assembly, which is indicated in broken lines 21. Guide rod 21 is centered on axis 22, which is parallel to axis 17. Together axes 17 and 22 define a plane generally referred to as the customer reference plane. In the final use of the head assembly, the nominal plane of the diskette will be parallel to the customer reference plane, but spaced from it by a specified dimension.

Head 0 has a planar upper face for contacting the disk surface and is mounted within a support 24. Head 0 together with its support 24 are a type of head assembly known in the industry as a "button" head. According to one design head 0 is mounted within support 24 by a suitable adhesive such as epoxy. According to another design as set forth in my co-pending application Ser. No. 290,336 now abandoned, head 0 is mounted to support 24 by a suspension that allows controlled movements in the Z axis. In either case, support 24 is secured to carriage 11.

Support arm 12 is secured to carriage 11 by means of a leaf hinge 25 formed of a flat strip of flexible metal. Leaf hinge 25 is clamped to the back end of support arm 12 by suitable means, and is also clamped to carriage 11 by means of a pair of clamp blocks 26, 27. A bias spring 31 is secured to the top of block 26 and applies a downward force to support arm 12 to provide the desired degree of tracking force for the heads.

At the other end of support arm 12, head 1 is mounted to a gimbal-type flexure 34 which is shown cut away in FIG. 1 for purposes of clarity. The arm shown in FIG. 1 has a snap out cover 32 in accordance with the transducer assembly shown in co-pending application although this is not necessary for use of the optical verification of the present invention. Cover 32 has a threaded opening through which a pivot pin 30 projects to contact the back of the flexure at about the center of head 1 to provide the pivot point for the gimballing action of flexure 34. A lift tab 33 is provided for engagement with suitable lifting mechanism on the disk drive for lifting head 1 to allow insertion and removal of the diskette in use. In FIG. 1 the support arm is shown lifted for purposes of clarity, but in use bias spring 31 moves support arm 12 downward until the heads would be sandwiched in contact with the diskette in between.

In accordance with one aspect of the present invention, a pair of apertures 35 and 36 are provided in snap out cover 32, or if no snap out cover is used, in the body of arm 12 above the head 1. A pair of small reference marks or targets are formed on portions of the flexure 34 which moves with and is secured to head 1. The marks are positioned in alignment with apertures 35 and 36 for tracking movement of the head as will be explained hereinafter.

The precise positioning of the read/write gaps for head 0 and 1 with respect to the carriage is specified in terms of rectangular coordinates X, Y and Z. As previously mentioned, the customer reference plane is defined by axis 17 and 22. The X-Y plane is parallel to, but spaced a distance h above, the customer reference plane. The X-Y plane is at the same elevation as the face of the core of head 0. The Y axis is the theoretical location of the centerline of the read/write gap of head 0, and is located a distance X' from axis 17. The front surface, 39, of carriage 11 is called the carriage reference surface, and is perpendicular to axis 17 and 22. The X axis is located a distance Y' from the carriage reference surface, and is at the theoretical location of the read/write track centerline for head 0. The Z axis is perpendicular to the X-Y plane and intersects the theoretical read/write gap centerline for head 1.

Reference line 40 is an extension of the read/write track centerline of head 0. Line 40 should be coincident with the X axis if head 0 is correctly positioned; and any angle in the X-Y plane between line 40 and the X axis is an azimuth error for head 0. Reference line 41 is an extension of the read/write track centerline of head 1 when it is in the operative position (not the lifted-arm position as shown in FIG. 1). Line 41 should be parallel to the X axis if head 1 is properly aligned; and any angle in the X-Y plane of line 41 to the X axis represents an azimuth error of head 1. According to industry standards, the read/write track centerline of head 1 is not placed directly over the read/write track centerline of head 0, but instead is offset by a distance in the Y axis direction. The Y-offset is indicated in FIG. 1 by the distance between reference lines 40 and 41. The industry standard for the Y-offset is 0.0833 inches, with a tolerance of plus or minus 0.0005 inches for the case of 48 tracks per inch density, or a tolerance of plus or minus 0.0003 inches in the case of 100 tracks per inch density.

In practice it has been found necessary to control the positioning of the centerline of the read/write gap of head 0 with respect to the carriage as follows. Dimensions of the X and Z directions must be held to plus or minus 0.001 inches from X' and h respectively, and positioning in the Y direction must be held to plus or minus 0.002 inches of dimension Y'. Similar dimensional constraints apply to the positioning of head 1. The nominal positioning for head 1 in the X direction is identical to that for head 0, so that both gaps would align with the Y axis. The positioning of head 1 in the Y direction is the amount Y-offset from the positioning of head 0. There is no Z dimension for the positioning of head 1, as that is taken care of by forcing the head into contact with the disk in the use position.

Figure 2:
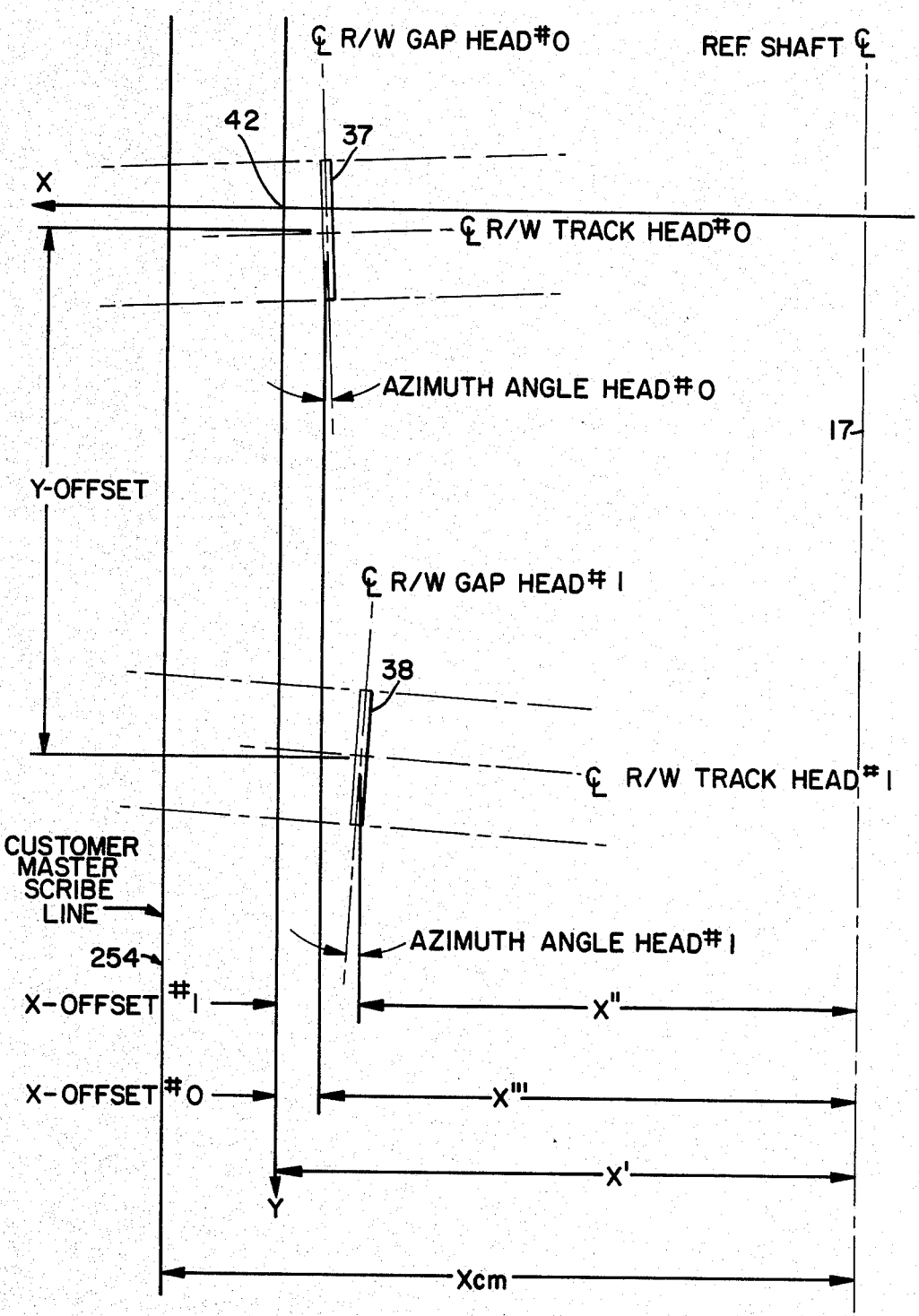
FIG. 2 is a diagram illustrating alignment measurement parameters for the head gaps of the head assembly of FIG. 1.

In order to verify alignment, precise measurements have to be made of the positioning of the head gaps. The measurements to be made are indicated in FIG. 2, which is a diagram, at enlarged scale, of the X-Y plane of FIG. 1 with the read/write gaps and tracks for heads 0 and 1 superimposed on it. In FIG. 2, axis 17 which is the centerline of the reference shaft for the carriage and the customer reference plane is shown. The Y axis is also shown, parallel to axis 17 and spaced from it by the distance X'. The correct theoretical positioning of the read/write gap head 0, i.e. positioning of the intersection of the centerline of its gap and the centerline of its track, would be at the point 42, which is the intersection of the X and Y axis. In FIG. 2, reference number 37 indicates the position of the read/write gap for head 0, with the track for head 0 being indicated in phantom line. Similarly, reference number 38 indicates the position of the gap of read/write head 1, with its track being indicated in phantom line. The center of the gap for head 0, i.e. the intersection of its gap centerline and track centerline, should coincide with point 42, which is the intersection of the X and Y axis, if head 0 is placed at its theoretical location. In the example shown, the head is at a distance X''' from axis 17, giving an X-offset for head 0 which is the difference between X' and X'''. Head 0 is also misplaced from point 42 by an amount in the Y direction which is not identified by reference in FIG. 2. The azimuth angle for head 0 is indicated as the angle between its gap and the reference shaft centerline. This is measured prior to alignment on other equipment.

The positioning of the read/write gap of head 1 to be measured is also indicated in FIG. 2. The X dimension for head 1 is X'', and the error between X''' and X' is indicated as the X-offset 1. The difference in Y positioning between head 0 and head 1 is the measured Y-offset, which, as previously indicated, should be within the industry standard dimension. Any azimuth error of head 1 is measured as the angle between the gap of head 1 and the reference shaft centerline. The positioning and purpose of the customer master scribe line 254 is explained below under the alignment procedure.

The primary technique for verification of head alignment according to the present invention involves the use of an optical measurement apparatus having a small objective probe designed to be placed between the faces of heads 0 and 1. The probe contains optical systems that permit viewing of the faces of both heads from directions perpendicular thereto. Calibrated reticles and accurate positioning devices are used for accurately measuring the positions of the read/write gaps of the heads with respect to the required dimensional tolerances.

Figure 3:
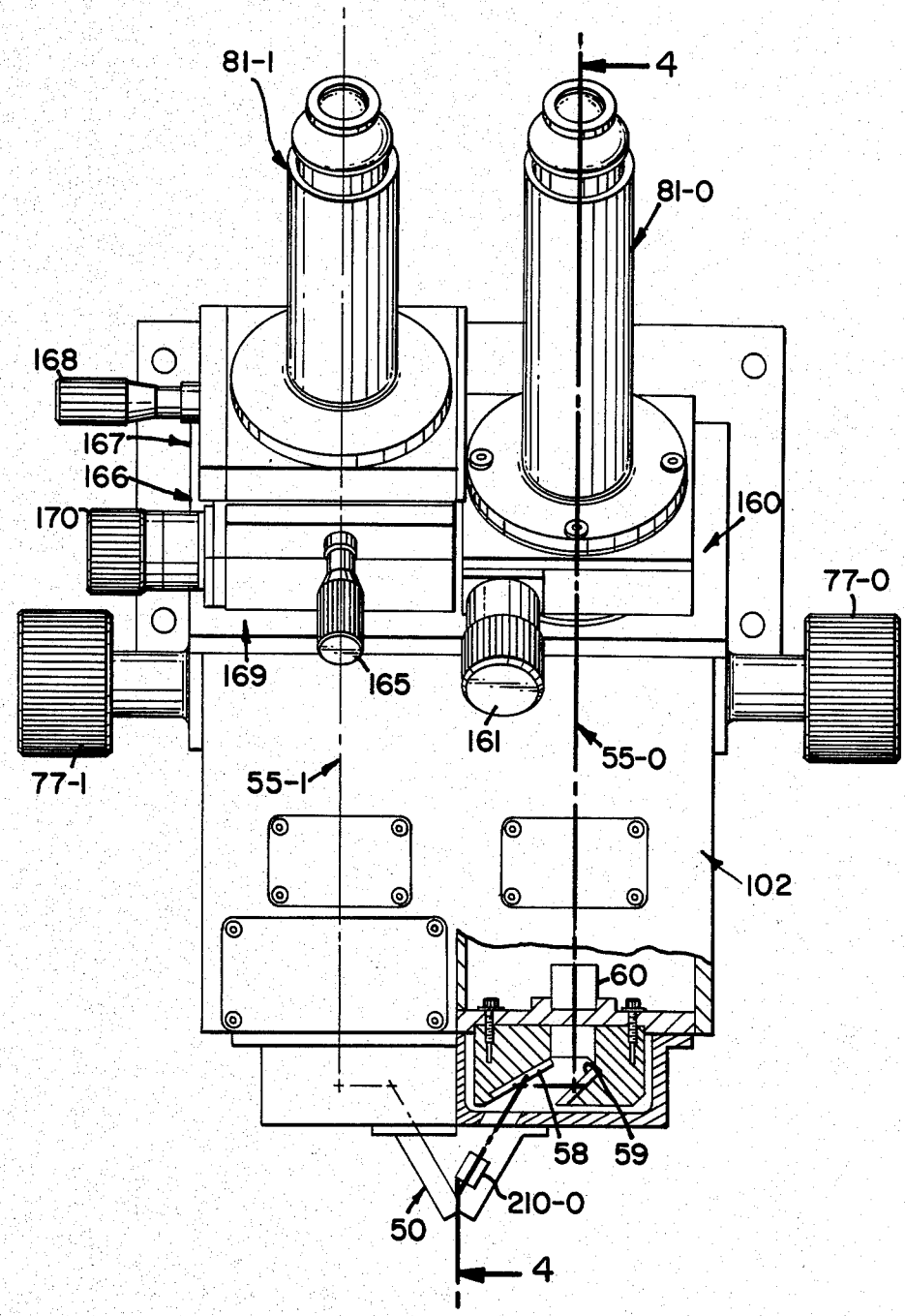
FIG. 3 is a front elevational view of an optical alignment verification microscope according to the present invention.
Figure 4:
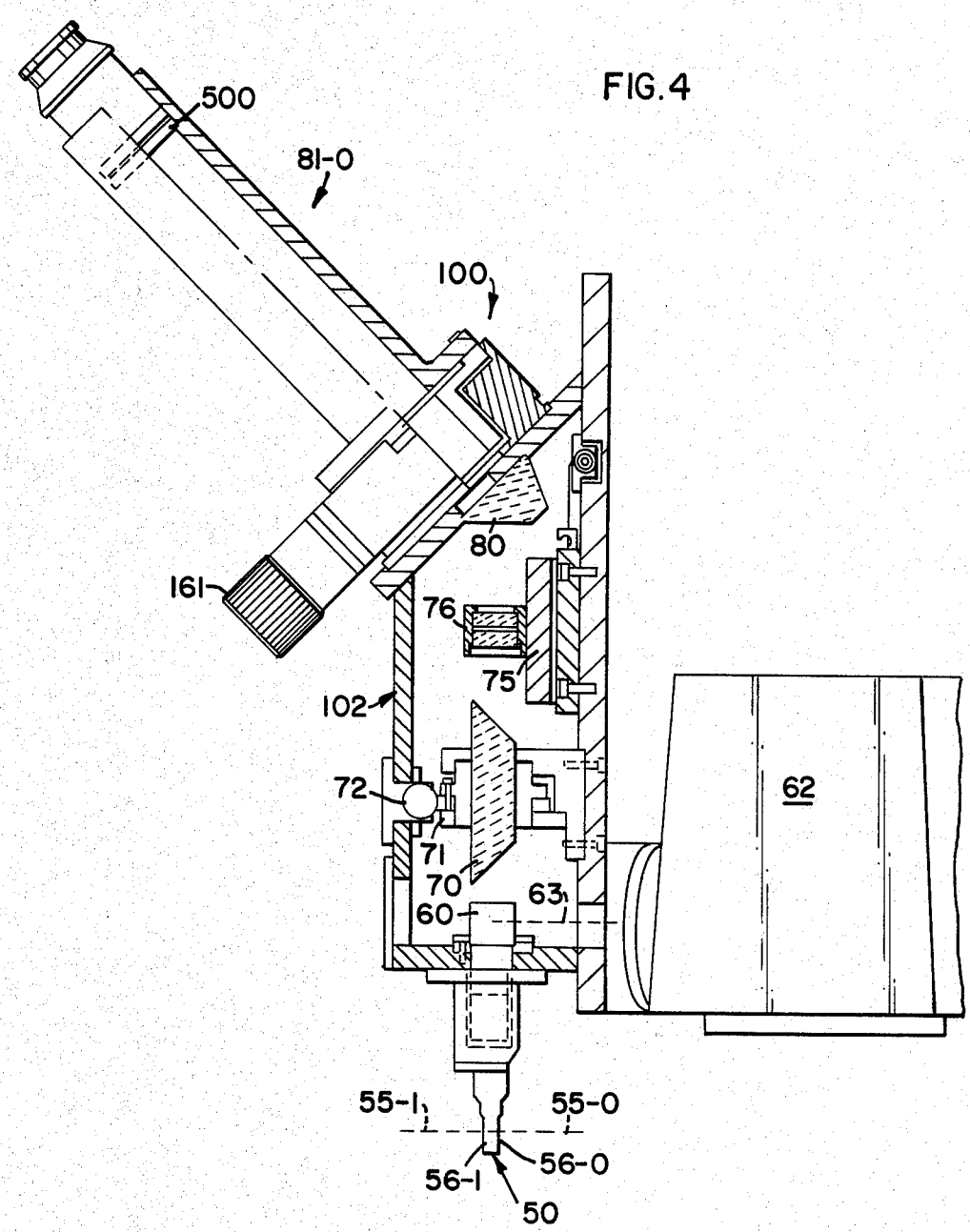
FIG. 4 is a sectional view as seen along line 4—4 of FIG. 3.

Referring to FIGS. 3 and 4, the main optical components of the verification microscope 100 for verifying head alignment are shown in diagrammatic form. Within body or housing 102 are optical elements defining two optical axes or paths 55-0 and 55-1, corresponding to heads 0 and 1. The optical axes 55-0 and 55-1 extend through the instrument from objective probe 50 through eyepieces 81-0 and 81-1, respectively. Objective probe 50 has two parallel opposite viewing surfaces 56-0 and 56-1 adapted for placement in close opposition to the faces of heads 0 and 1, respectively, when probe 50 is inserted between transducer heads. The thickness of objective probe 50, i.e. the distance between parallel faces 56-0 and 56-1 in the preferred embodiment is 0.250 inches. As explained in greater detail below with reference to FIG. 5, objective probe 50 includes prisms for deflecting the optical axes perpendicularly within the objective probe so that optical axis 55-0 projects perpendicularly from viewing surface 56-0, and optical axis 55-1 projects perpendicularly from viewing surface 56-1.

Within objective probe 50 the two optical axes diverge from each other at a 60 degree angle and pass through the various optical element to the eyepieces. With reference to FIGS. 3 and 4, the optical elements for axis 55-0 are shown in section, with the corresponding elements for optical axis 55-1 being similar.

Within objective probe 50 is an objective lens assembly 210-0 for the channel 0 optical axis. A pair of mirrors 58 and 59 are positioned to align the optical axis for the eyepiece. A prism beam splitter 60 is provided in the optical path, and it is used in conjunction with a lamp assembly 62 to provide illumination for viewing the head surface. Lamp assembly 62 which includes collimating optics (not shown) provides a beam of light along axis 63 to beam splitter 60 which adds a light into optical axis 55-0 and sends it down to the objective probe to illuminate the surface area of head 0 when it is brought adjacent viewing surface 56-0. Light reflected from the face is gathered through the objective probe and imaged by the objective lens assembly 210-0 for transmission of optical axis 55-0.

Since the optical axes for channels 0 and 1 diverge from each other at 60° in the objective probe the images from the two channels will be skewed with respect to each other. Therefore each channel is provided with an image rotator, with that of channel 1 being shown in FIG. 4. Dove prism 70 is provided in the optical path for rotation of the image. An adjustment system comprising a ring gear 71 and a gear 72, preferably a worm gear, is provided for adjustment of the rotational position of prism 70 about the optical axis for fine tuning the rotation of the image.

An internal focusing lens assembly 76 is provided for on the optical axis, and it is positioned with a suitable focusing mechanism and focus knob 77-0 which is adapted for adjustment of lens assembly 76 along the optical axis to change the focus of the system.

Prism 80 is provided for directing the optical path up through eyepiece assembly 81-0. Reticle 500 is positioned in the optical path in the viewing section between prism 80 and eyepiece 81-0.

Eyepiece 81-0 of the channel 0 optics is mounted on a rotary adjust stage 160, which is controlled by control knob 161. This permits angular rotation of the reticle 500 within eyepiece 81-0, which is used in the calibration and verification procedure as explained more fully below.

Eyepiece 81-1 for the channel 1 optical path includes a similar rotary stage, and also X and Y movement stages. The eyepiece is mounted on Y-stage 167 which in turn is mounted on X-stage 166 which in turn is mounted on rotary stage 169. Control knob 170 controls rotary movement, and controls 165 and 168 control the X and Y adjustments, respectively. These adjustments permit rotation of the reticle within eyepiece 81-1, and also displacements in X and Y directions, which are used in the calibration and verification procedure. A suitable electronic position encoder or measurement device is associated with the channel 1 rotary stage, to permit readout of the amount of movement thereof. If desired, similar encoders can be provided for the channel 1 X and Y stages and for the channel 0 rotary stage, however they are not needed for the verification procedure set forth in detail below, because these stages are only used for calibration set-up.

FIGS. 5a, 5b and 5c show the objective probe in greater detail. The objective probe area includes a housing 203 and an end piece 204 which is secured thereto by suitable means such as shoulder screw 205. Housing 203 includes a pair of identical objective lens assemblies for the two channels. Only lens assembly 210-0 for channel 0 is shown. The other objective lens assembly which is not shown for purposes of clarity is positioned in the area indicated by reference number 210-1 and is centered on optical axis 55-1 for the channel 1 optics. Axes 55-0 and 55-1 diverge from one another at a 60° angle to interface with the remaining optics of their respective paths.

Prisms 200 and 201 for the 0 and 1 channel optical paths, respectively, are positioned side by side in the objective area. Prism 200 has a face 200a which corresponds to viewing surface 56-0 of the objective probe, and which is used for viewing head 0. Prism 200 also has a face 200b which faces objective lens assembly 210-0. Prism 201 is similar to prism 200. However, it is reversed so as to have surface 201a corresponding to viewing surface 56-1 of the probe, for viewing head 1, and a surface 201b facing the channel 1 objective lens assembly 210-1.

Each objective lens assembly 210-0, 210-1 consists in the preferred embodiment of a five element lens assembly having a numerical aperture of 0.60, a magnification of 50 and a working distance of 0.250 inch from the first optical lens to provide for flat field viewing over a 0.0175 inch object spaced 0.0004 inch from the viewing face of the prism. In the case of prism 201 for channel 1, the spacing is provided by 0.0004 inch thick chrome spacer bands at location 212 which space head 1 the appropriate distance from the surface of the prism and also protect the prism from damage through contact. Similar chrome bands but of thickness 0.0001 are provided on prism 200 at location 213 for protection of the prism, but are not used for spacing, as a non-contact position is usually maintained between the probe and head 0.

In operation, the front folding prisms 200 and 201 provide optical access to the faces of heads 0 and 1 by creating an apparent image of the respective head face normal to the optical axis of the objective lens assembly. The objective lens assemblies 210-0, 210-1 collimate the light rays as they exit from the last lens. The images are then rotated by the dove prisms. The focusing lens assemblies focus the input collimated light into the field of the eyepieces through the folding prisms. If there are deviations in the location of the magnetic head faces with respect to the surface of the prism from the designed 0.0004 inch spacing, the light exiting the objective lens assembly is no longer collimated, but is slightly converging or diverging. By translating the focusing optics along the optical path by adjustment of control 77-0 or 77-1, the converging or diverging beam can be brought to proper positioning in the field of the eyepiece. An additional 10 power magnification is provided in the eyepiece giving an overall magnification of 500.

The optical instrument of FIGS. 3, 4 and 5 described above will provide images at the eyepieces of the faces of the transducers when the transducer assembly is placed with the heads on either side of objective probe 50. However, certain geometric considerations regarding the thickness of the objective probe and the placement of the heads on it must be taken into account before actual measurements of the positions of the read/write gaps of the heads can be made.

Because the objective probe of the measurement instrument is thicker than a diskette, it is necessary to lift the support arm to a higher position to receive the objective probe than would be necessary to receive a diskette. This lifting of the arm induces shifts in the position of the gap of head 1, and these induced errors must be accounted for in order to arrive at accurate measurements of the position of the head 1 gap when in its normal use position in contact with a diskette.

Figure 6A:
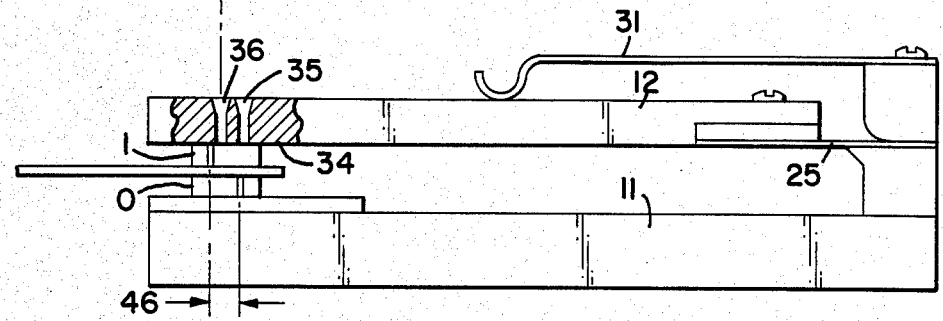
FIGS. 6a and 6b are diagrammatic representations of the head assembly of FIG. 1 showing placement of the objective probe in measurement position.
Figure 6B:
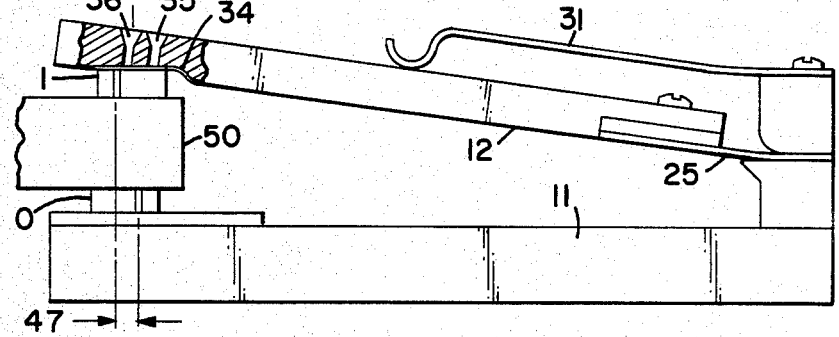

FIGS. 6a and 6b show cross sectional views of the head assembly of FIG. 1, in somewhat more diagrammatic or schematic form. In FIG. 6a the lift arm 12 is in operative position with heads 0 and 1 in contact with opposite sides of a floppy disk. Reference number 46 indicates the Y-offset between the centerline of the tracks of heads 0 and 1.

In FIG. 6b lift arm 12 has been opened farther to accept objective probe 50 of the optical verification instrument. Because objective probe 50 is thicker than the floppy disk medium, arm 12 is required to open wider than in FIG. 6a. The thickness of objective probe 50 in FIG. 6b has been exaggerated for purposes of the following discussion.

In FIG. 6b the surface of head 1 in contact with objective probe 50 (actually it is the chrome spacing bands that make the contact) remains parallel to the probe surface. The gimbal flexure 34 which mounts head 1 flexes to permit it to assume the parallel position notwithstanding the greater open position of the lift arm in FIG. 6b. One limitation for the use of this type of optical verification equipment is that the gimbal flexure of the head assembly must permit sufficient angular movement of head 1 to accept probe 50 without acquiring a permanent set or deformation.

An examination of FIGS. 6a and 6b will show that the rotation of arm 12 about leaf hinge 25 to accept the great thickness of objective probe 50 results in a displacement of the position of the track centerline for head 1. This results in an altered Y-offset dimension 47. The altering of the Y-offset dimension can be visualized by considering the upper arm 12 to be essentially a radius pivoting about a pivot line on leaf hinge 25. It will be seen that the projection of the track centerline of head 1 upon the X-Y plane will move inwardly toward the pivot center as the arm is raised. However, in practice if head 1 is initially positioned below leaf hinge 25, i.e. closer to the X-Y plane than leaf hinge 25, depending upon the design of the particular arm assembly, it is possible that the projection of the head 1 track centerline on the X-Y plane may initially move outwardly from the pivot center upon raising the lift arm, and then move inwardly upon further raising of the lift arm.

It will thus be seen that lifting the arm to insert the objective probe between the heads itself causes movement of the head 1 track centerline in the Y direction. In order for measurements to be made to verify head alignment, it is necessary to account for this and other movements, referred to as induced errors, caused by the measurements process itself. Unfortunately, however, for most head assembly designs it is not possible to calculate the precise amount of induced error in the position of the head 1 track that will be caused by raising the lift arm. There are a number of factors which serve to introduce basically unpredictable changes in not only the Y position, by also the X and azimuth positioning of the head 1 gap and track as the arm is raised.

One source of error is the fact that leaf hinge 25 actually forms a radius over which the bending is distributed, rather than behaving as a single pivot line. Also, different arm and head configurations for different models or customers could result in different amounts of shift of the head 1 track due to differences in geometry, and of course it is desirable to have a single verification apparatus that is not limited to a particular model, but that is general enough to verify a variety of different head assembly designs.

A further complication that prevents pre-calculation of the displacement of the head 1 read/write gap position due to raising the lift arm stems from the fact that the theoretical hinge axis for leaf hinge 25 might be mispositioned. In FIG. 1, reference 28 is an extension of the theoretical hinge axis for leaf hinge 25. Axis 28 is of course parallel to the customer reference plane and perpendicular to axis 17. However, in practice, due to slight errors in the manufacture or positioning of clamping blocks 26 and 27 and tolerances in the molded carriage 11, it is possible that the actual hinge line of the leaf hinge may be displaced through an angle alpha' in the X-Z plane, or through an angle gamma in the X-Y plane, or both. These error angles alpha' and gamma will result in further displacements of the position of the read/write track of the head 1 in both the Y and X directions and in azimuth errors, as the lift arm 12 is lifted to accept the objective probe. Mathematical analysis, based upon the magnitude of angles alpha' and gamma that can reasonably be held during the manufacturing process, shows that the X and Y errors introduced by these error angles is of the same order of magnitude as the tolerance for the X and Y positioning of the head gaps. It must be appreciated that small error angles alpha' and gamma have no bearing whatsoever on the alignment of a head assembly when in the operating position. However, upon raising the lift arm 12 to a higher position to accept the optical verification system objective probe, these error angles could induce X and Y shifts of head gap position amounting to greater than the X and Y position tolerances to be measured. Further, the above analysis was based upon assumed straight edge hinge lines, and the practical effect of the distributed bending of leaf hinge 25 along a radius would be to add to the amount of error.

It is therefore apparent that there is a need for compensating for the induced X and Y gap position and azimuth errors introduced during the verification process, and this is taken care of by the optical tracking scope. In FIG. 6A, the objective portion 141 of the tracking scope is aligned to view through aperture 36 to the marked spot under aperture 36 on the flexure for head 1. Alternately, aperture 35 and its marked spot could be used. In FIG. 6B, the marked spot has moved in X or Y directions due to the various causes discussed above. Tracking scope 141 has been moved to once again align with the marked spot. The amount of movement of tracking scope 141 in the X and Y directions, which can be accurately measured by position transducers, provides an exact measure of the induced X, Y and azimuth errors in head position caused by the raising of lift arm 12 to accept the thickness of probe 50.

Another source of error is due to the fact that the face of head 0 might not be parallel to the customer reference plane. In FIG. 6A, the face of head 1 is parallel to the face of head 0, assuming uniformity in the diskette. However, in the measurement position of FIG. 6B, the face of head 1 is parallel to the face of objective probe 50, which in turn is parallel to the customer reference plane. If there is a non-parallelism error in the positioning of head 0 in the carriage, then the face of head 1 in FIG. 6B will not be parallel to what it was in FIG. 6A. This in turn means that some flexing of flexure 34 and pivoting of head 1 about pivot 30 will have taken place. This can introduce movement in a point on the core of head 1 in X and Y directions which will not be observed by the verification system. Therefore a measurement of parallelism of head 0 to the customer reference plane should be made. That information can then be used to compensate for the above-noted shifts in Y and X directions.

In the preferred embodiment, the measurement of non parallelism of head 0 is made through use of the optical apparatus. In order to compensate for the above-noted shifts, certain dimensions of head 1 must be entered into the calculations. FIG. 14a is a diagrammatic view in the Y-Z plane of the transducer core for head 1. Point P is the contact point for the pivot pin 30 (FIG. 1) about which head 1 can pivot on its flexure. Point B is a point on the read/write gap of the transducer. The figure shows the head rotated through an angle $\theta_1$ (exaggerated for purposes of illustration) which would be the case when head 1 was parallel to head 0 if head 0 is not parallel to the customer reference plane. Dimensions a and b are the distances from the pivot point P to the gap B in directions parallel and perpendicular, respectively to the face of the core, which would coincide with the Y and Z direction if $theta_1$ were 0. FIG. 14b is a similar diagrammatic view of the core of head 1, but in the X-Z plane. Head 1 is rotated through an angle $theta_2$ due to nonparallelism of head 0, which causes a shift in the X position of the gap, point B. Dimension d is the distance from the pivot point P to the gap B in a direction parallel to the face of the core, coinciding with the X direction if $theta_2$ were 0. Dimensions a, b, and d are used in calculations after the measurement stage to compensate for the nonparallelism errors.

Figure 8:
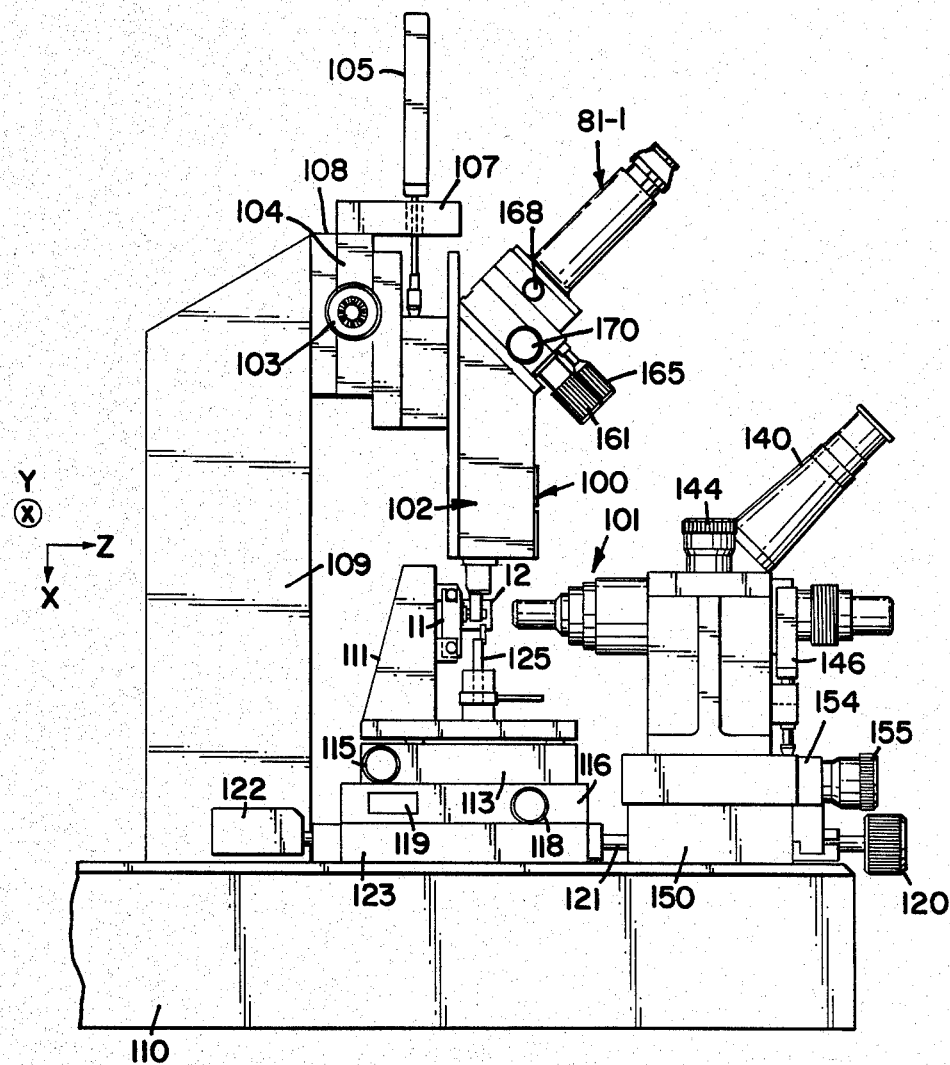

Referring now to FIGS. 7 and 8, the completed apparatus for measurement of head alignment is shown. Reference number 100 generally designates the verification scope, and reference number 101 generally indicates the tracking scope. A head assembly is mounted in position for test as indicated by reference numbers 11 showing the carriage and 12 showing the support arm. Heads 0 and 1 are on opposite sides of objective probe 50. The main body of the verification scope 100 is indicated by reference number 102. It is mounted on main stage 104 for movement in the X direction with respect to the coordinate system previously defined for the carriage, by means of a rack and pinion adjustment mechanism 103 which preferably has fine and coarse adjustment control knobs for moving the entire verification scope body in the X direction. A position encoding device 105 is provided attached to a bracket 107. Encoder 105 has a probe in contact with body 102. Encoder 105 may be any type of commonly used position encoding device such as a linear transformer, optical grating or the like. It functions to provide an electronic output indicative of the linear position of scope 100 in the X direction, and any adjustments to that position caused by moving adjustment 103. Adjustment mechanism 103 and bracket 107 are secured to a cross member 108. Cross member 108 is in turn secured to a pair of upright members, one of which is indicated by reference number 109 in FIGS. 7 and 8. The uprights are secured to a stable base member 110 which supports the entire apparatus.

From the above it will thus be appreciated that the optical verification scope 100 is capable of precise adjustments in the X direction only, and that those precise adjustments are detected and measured by an encoding device.

As previously mentioned, the head assembly is positioned so that the heads are on either side of objective probe 50. In FIG. 8, this positioning is seen by reference numbers 11 and 12 which show the positions of the head assembly carriage and support arm. Carriage 11 is positioned by a tooling plate 111 which in turn is secured to a rotary stage 113. Tooling plate 111 includes a means (not shown) for securely clamping and holding the carriage 11 of the head assembly being tested, and also includes a lift device 125, which for example can be an air piston device, for engaging tab 33 to lift arm 12 of the head assembly. The rotation of tooling plate 111 on rotary stage 113 is controlled by a suitable actuation linkage within rotary stage 113 controlled by actuating knob 115.

Rotary stage 113 is secured to member 116, which is part of the Y-Z movable stage. Specifically, member 116 is positioned for movements in the Y direction with respect to a member 123. These Y direction movements are controlled by a linkage (not shown) operated by control knob 118. An encoder 119 measures the Y position movements of member 116.

Member 123 in turn is supported for movements in the Z direction with respect to base 110. These Z direction movements are controlled by a suitable linkage (not shown) operated by control knob 120 operating through shaft 121. The Z direction movements are measured by encoder 122. It will thus be appreciated that the above described mounting for the head assembly permits controlled and measured movements in the Y-Z plane as well as rotational movement.

Because the carriage 11 can be moved in the Z direction, through a fine control with large mechanical advantage, or even by a motorized control, it would be possible to damage optic probe 50 by moving the carriage too far. To control positioning of head 0 the desired distance from the surface of the optic probe, an optical micrometer is provided, in the form of an optical micrometer transmitter unit 180 and receiver 181. In the preferred embodiment a laser micrometer system, model 120F by Zygo, is used. Transmitter unit 180 is positioned on upright 109, and receiver 181 is positioned on a mounting plate on the opposite side of the apparatus to provide a line of sight 182 which passes between the face of head 0 and surface 56-0 of the optic probe. This micrometer device permits movement of the tooling plate via Z-stage 123 and control 120 to bring the face of head 0 to the desired 0.0004 inch spacing without actual contact or possible damage. For clarity transmitter 180 and receiver 181 are omitted from FIG. 8.

The tracking scope is of conventional design and includes an eyepiece assembly 140 and an objective assembly 141. As previously mentioned, the objective is placed to view the target mark on the flexure for the upper head through the aperture provided in the support arm. Specifically, tracking scope 101 is mounted to an X-stage 143 that permits movement of the tracking scope 101 in an X direction by means of a suitable linkage and X-adjust control knob 144. Movements in the X direction for the tracking scope are measured by encoder 146. Stage 143 is connected to a Z-stage 154 which is movable with respect to the Y-stage 150 by means of adjustment knob 155. Y-stage 150 is moveable with respect to base 110 by means of adjustment knob 151. Movements of the tracking scope in the Y direction are measured by encoder 152.

The rotary adjustments for the reticles at both eyepieces 81-0 and 81-1 and the X-Y adjustments of eyepiece 81-1 are discussed above with reference to FIG. 3.

Figure 9:
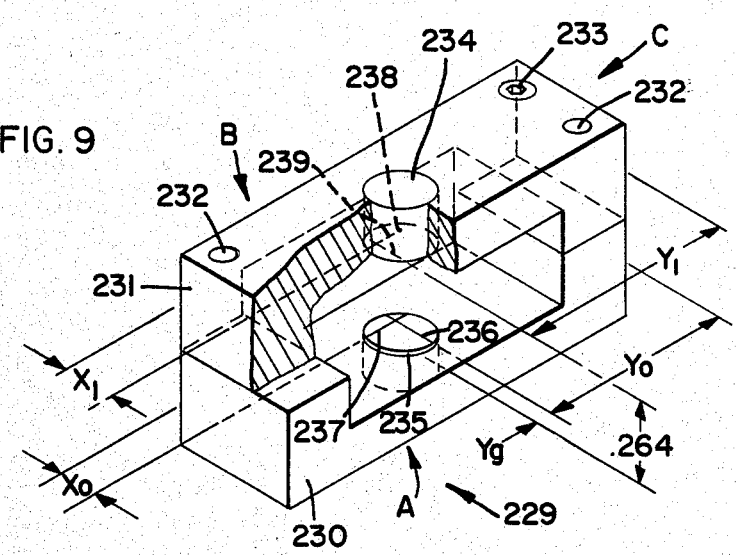
FIG. 9 is a master gauging block assembly for calibration of the verification apparatus.

For calibration purposes, a master gauge block assembly 229 of FIG. 9 is provided. It is made in two C-shaped blocks 230 and 231 which are held together with screws 233 and taper dowel pins 232. The C-blocks have cylindrical inserts 234 and 235 which have highly polished surfaces. The air gap between polished surfaces of the cylindrical inserts is 0.264 inch. The cylindrical inserts have scribe lines on their polished surfaces that face each other thus providing an inside reference for the optic probe. Channel 0 of optic probe will view the scribe lines 236 and 237 of insert 235 and channel 1 of optic probe will view the scribe lines 238 and 239 of insert 234.

The necessary accuracy in the master gauging block can be obtained by the following procedure:

1. Bolt and dowel C-block 230 to C-block 231 with cylindrical inserts 234 and 235 in place.
2. Grind and lap surfaces A, B and C.
3. Disassemble master guage block and scribe lines 236 and 239 using surface C as a reference. Scribe lines 237 and 238 using surface B as a reference. Scribing devise has a diamond tip which produces a line with consistant width and straightness.
4. Measure dimensions $X_o$, $X$, $Y_o$, $Y$ with an inspection microscope.

$$Y_G = Y_1 - Y_o$$

$$X_G = X_1 - X_o$$

5. Reassemble master guage block. The taper dowel pins 232 will assure scribe line alignment.

For convenience, where alignment is to be verified on head assemblies using 1½ inch length arms and also assemblies using 2 inch length arms, a compromise value for the $Y_G$ dimension of FIG. 9 can be adopted which is the average of the altered Y-offset on FIG. 6b for the two cases, but in any event, the exact value is measured and used for the verification reference.

Figure 10:
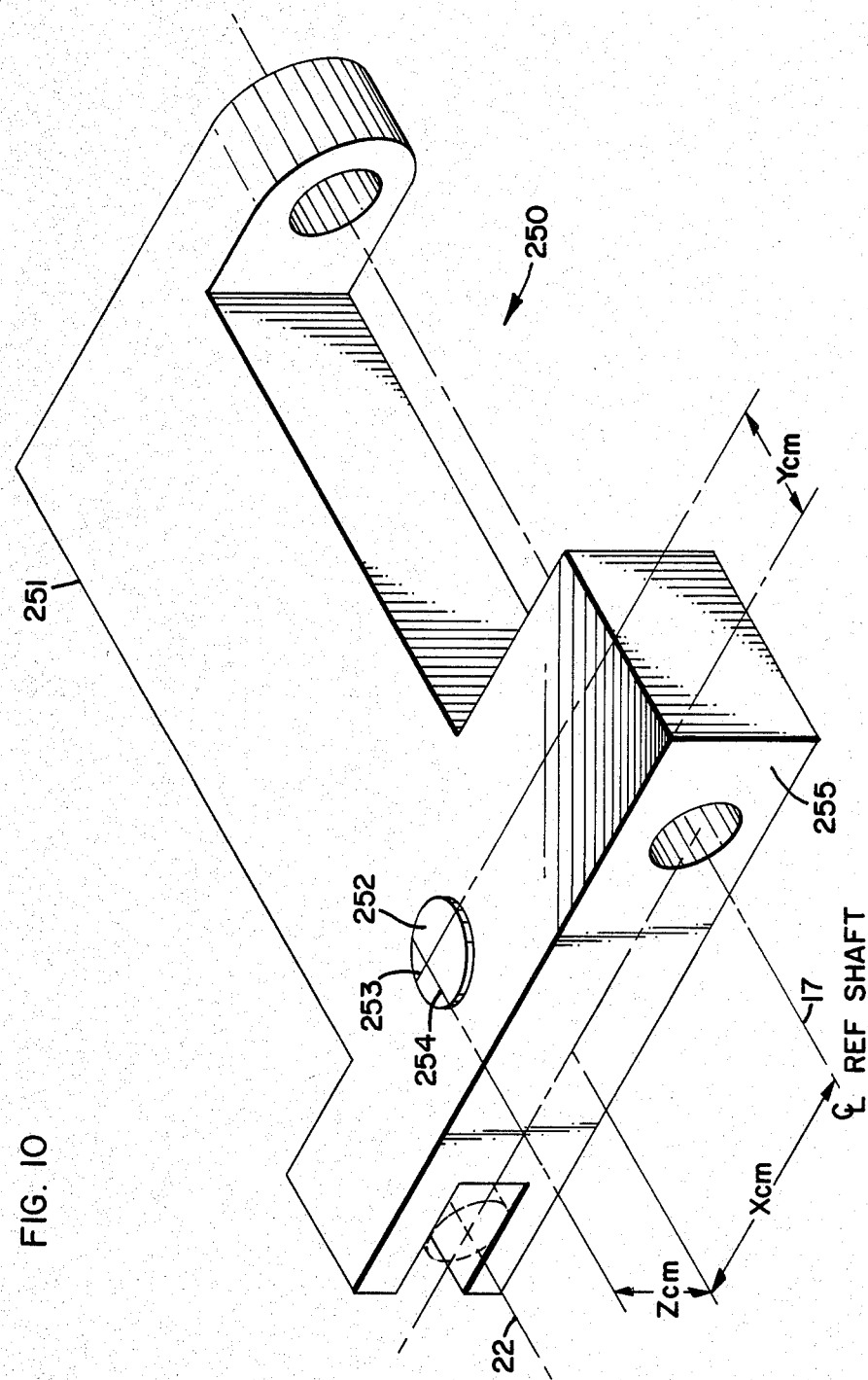
FIG. 10 is a customer master reference for calibration of the verification apparatus.

FIG. 10 shows a customer master 250. The customer master consists of carriage 251 and a cylindrical insert 252. This carriage resembles carriage 11 for the particular head assembly design but is made from tool steel and has jig ground reference holes and ground surfaces so that it can be accurately positioned on tooling plate 111 of the verification apparatus. In the example of FIG. 10, the customer reference plane is established by the two shaft center lines 17 and 22.

Two scribed lines 253, 254 are placed on the polished surface of cylindrical insert 252. The 253 line represents the center line of the read/write track of head 0 and the 254 line represents the center line of the read/write gap of head 0. Dimensions $X_{cm}$, $Y_{cm}$ and $Z_{cm}$ from FIG. 10 are measured and recorded using an inspection microscope.

Figure 11:
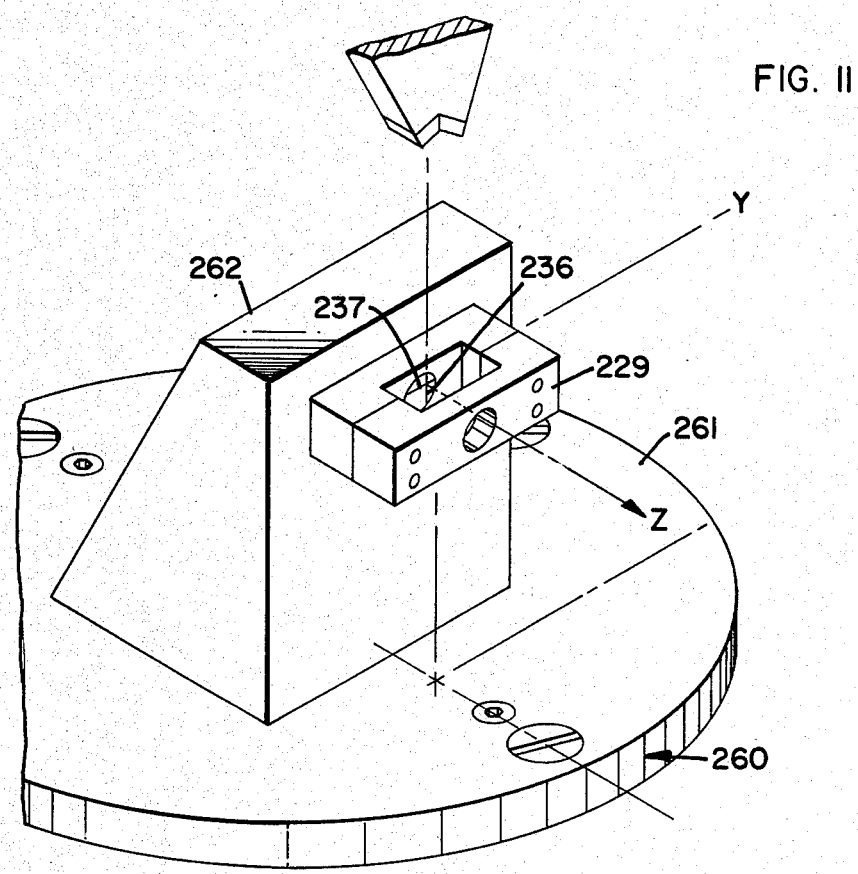
FIG. 11 is a master tooling plate assembly for use in calibration of the verification apparatus.

FIG. 11 shows a master tooling plate 260 which consists of a master gauge block assembly 229, a verticle upright 262 and a base plate 261. Th purpose of the master tooling plate is for initial calibration of the verification microscope. It will hold the master gauge block assembly rigidly thus eliminating the inaccuracies found at the shaft to bore interface of the customer master. The master tooling plate will be built so that scribe line 237 is parallel to the verification system base 110.

FIGS. 12 and 13 show reticles 500 and 510 used in channel 0 and channel 1 of the verification microscope. They are mounted in the eyepiece assemblies 81-0 and 81-1 respectively. The reticles are identicle and use a "self-centering" method of measurement. For 48 TPI heads with 0.013 inch wide tracks lines 501 and 504 are used to center the track (see FIG. 12). For 96 TPI heads with 0.0065 inch wide tracks, lines 502 and 503 are used to center the track.

OUTLINE OF VERIFICATION PROCEDURE

In summary, the procedure is to mount a head assembly in the apparatus, and use the tracking scope together with its position encoders to measure induced errors in the X and Y positioning of the head 1 due to the lift of the arm to accept the thickness of the optic probe. With the probe in place between the heads, the head assembly and scope are manipulated using the various X, Y and Z movements of the apparatus as discussed above, to center the head gap and track for head 0 in the channel 0 reticle. The apparatus is then moved as required to center the gap for head 1 in the channel 1 reticle, and the movements are measured. The induced error measurements are then substracted from these measurements, giving the net differences in position between the channel 0 and channel 1 heads. The differences are then compared to allowable tolerances.

The above outline assumes that the reticles of the verification scope are properly calibrated and that the channel 0 head is properly positioned on the carriage of the assembly. A separate calibration procedure is provided to ensure calibration of the apparatus, and any errors in the positioning of head 0 in the carriage can be measured through use of the detailed verification procedure below.

Calibration of the reticles is preferably accomplished on initial setup, periodically as a check, or whenever it is known that settings have been altered or disturbed. Calibration is accomplished by mounting the master gauge block in the apparatus as shown in FIG. 11, and inserting the probe of the verification microscope in the interior opening. With the apparatus properly positioned for viewing of both head 0 and head 1 reference marks, the channel 0 and channel 1 reticles are moved into alignment. Thereafter they should not be moved, except in rotation for azimuth measurements.

The customer master of FIG. 10 can then be mounted, and the movements of the apparatus of FIG. 8 adjusted to bring the intersection of the reference marks 253, 254 centered on the channel 0 reticle. The position measuring encoders are then zeroed, or otherwised noted. The customer master is then removed and a head assembly to be verified is installed. The apparatus is moved as required to center the channel 0 gap and track centerline in the channel 0 reticle (without moving the reticle controls). The position encoders are then compared with the settings for the customer master, to determine any positioning errors for head 0. Controls are further manipulated to center the gap and track centerline of head 1 in the channel 1 reticle (without moving the reticle controls). The encoder readouts are noted, and the correction factors for induced errors caused by lift of the arm, which have been measured by the encoders associated with the tracking scope, are applied to give the positioning data for the channel 1 head.

DETAILED CALIBRATION PROCEDURES

The apparatus of FIGS. 7 and 8 described above must be calibrated with reference to the master gauging block prior to measurement and verification of alignment of an actual head assembly. The steps for calibration, using the self-centering reticle are as follows. The calculations which accompany the verification procedure are preferably performed with an aid of a programmable calculator or computer. For this reason, and also for convenience in identification and reference to parameters, the following calibration and measurement procedures include assignments of storage locations (STO 1, STO 2, etc.) for the various measurements and other data. Preferably the position encoders are directly coupled to the inputs of the calculator for convenience and accuracy in making the various measurements.

1. Zero main stage Z axis in the following manner:
    a. Mount master tooling plate to verification apparatus.

b. Move Z axis main stage to approximate working position.

c. Lower microscope with X coarse adjust 103 until microscope enters air gap of master gauge block assembly 229. (See FIG. 11).

d. Obtain air gap measurement Z using optic measuring unit 180, 181.

e. Move Z axis main stage (120) until air gap Z=0.007 inch.

f. Zero Z-axis main stage D.R.O. (Digital readout for position encoder).

The above procedure will allow the optic probe to enter the master gauge block assembly with 0.007 inch clearance on both sides.

2. Move Z axis main stage (control 120) until a 0.0003 inch clearance exists between optic probe and 235 insert of master gauge block.

3. Adjust focus knob 77-0 until the surface of insert 235 is in view.

4. Adjust X and Y main stage controls 103, 118 until scribe lines are located.

Figure 15:
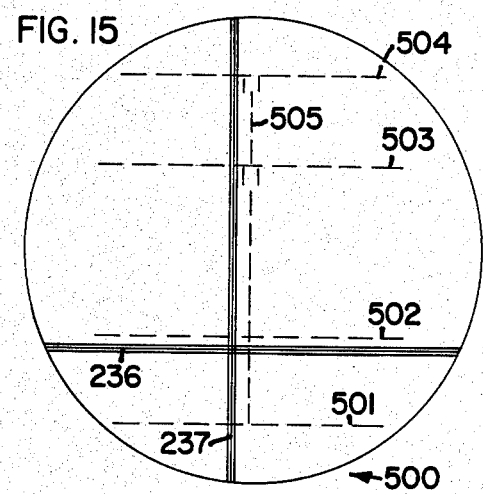
FIGS. 15-19 are views seen through the verification microscope at various stages in the calibration and verification procedures.

5. Rotate channel 0 reticle with 161 until reticle line 505 is parallel to scribe line 237 as illustrated in FIG. 15.

6. Adjust X and Y main stage controls 103, 118 until reticle lines 502 and 505 coincide with scribe lines 236 and 237 of master gauge block.

7. Zero X and Y main stage linear encoders 105, 119.

8. Move Z main stage control 120 so that there is 0.000040 inch clearance between optic probe and 234 insert of master gauge block.

9. Adjust focus knob 77-1 until the surface of insert 234 is in view.

10. Adjust X and Y eyepiece stages with controls 165 and 168 until scribe lines are located.

Figure 16:
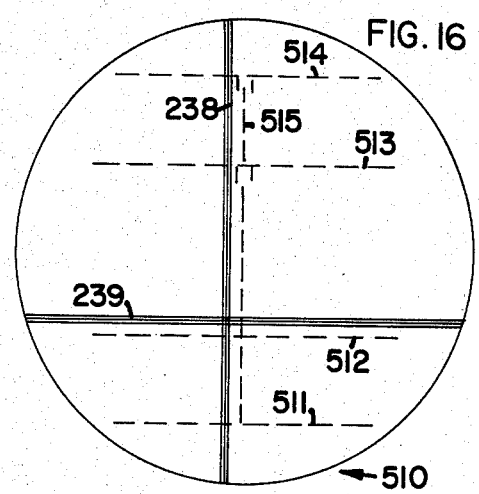

11. Rotate channel 1 reticle with control 170 until reticle line 515 is parallel to scribe line 238 as illustrated in FIG. 16.

12. Adjust X and Y eyepiece stages with controls 165 and 168 until reticle lines 512 and 515 coincide with scribe lines 239 and 238 of master gauge block.

13. Lock X, Y and rotary stages of eyepiece. Zero rotary encoder. Check that X and Y main stage D.R.O. are still zero.

14. The microscope is now calibrated to the master gauge block. Enter YG into STO 01 and XG into STO 02 of calculator.

15. Move Z axis main stage so that optic probe has 0.007 inch clearance with master gauge block, i.e., go to Z=0.

16. Raise microscope by means of X main stage control 103.

17. Remove master tooling plate 260.

18. Mount customer tooling plate to verification apparatus.

19. Mount customer master 250 to customer tooling plate.

20. Adjust Y and Z main stages to zero position.

21. Lower microscope by means of X main stage to zero position.

22. Obtain air gap measurement between customer master and optic probe using optic measuring unit 180, 181.

23. Move Z axis main stage (control 120) until a 0.0003 inch clearance exists between optic probe and customer master.

24. Adjust focus knob 77-0 until the surface of insert 235 is in view.

Figure 17:
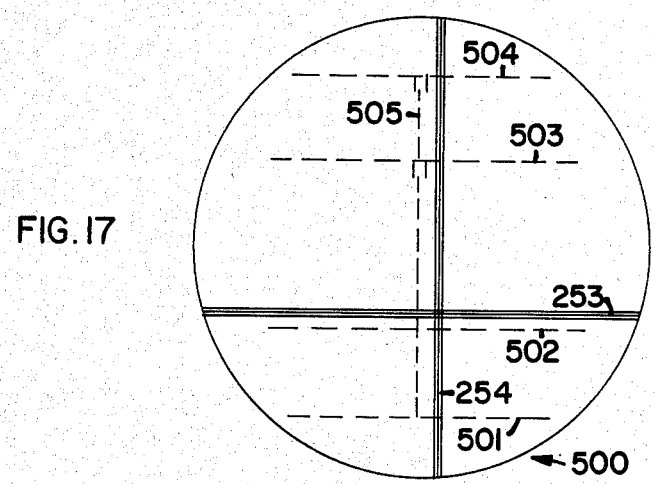

25. Adjust X and Y main stage controls 103, 118 until scribe lines are located. See FIG. 17.

26. Adjust X and Y main stage until channel 0 reticle lines 502 and 505 coincide with customer master scribe lines 254 and 253.

27. Zero X and Y main stage D.R.O.

28. The microscope is now calibrated to the customer master. Enter $X_{cm}$ and $Y_{cm}$ measurements from customer master into STO 22 and STO 25, respectively.

29. Move Z axis main stage to zero position.

30. Raise microscope by means of X main stage control 103.

31. Remove customer master from tooling plate.

32. Enter dimensions a, b, d, (FIGS. 14a, 14b) and X' into STO 16, 17, 18 and 19.

DETAILED HEAD VERIFICATION PROCEDURE

Initially, dimensions a, b, d, X' and $X_{cm}$ should be placed in STO 16, 17, 18, 19 and 33, respectively.

1. Place double sided head assembly 10 onto tooling plate 111.

2. Lift upper arm with lift device 125.

3. Lower verification microscope 100 by means of X main stage control 103 to the zero position.

4. Obtain air gap measurement $Z_D$ with optic measurement unit 180, 181. Then move $Z_D - 0.0003$ inch − 0.0001 inch.

5. Adjust internal focus 77-0 until head 0 is visible, if necessary.

6. Adjust X-Y main stage controls 103, 118 until read/write gap area of head 0 is located.

7. Enter X linear encoder 105 reading into STO 03 of calculator.

8. Enter Y linear encoder 119 reading into STO 04 of calculator.

9. Enter Z linear encoder 122 reading into STO 05 of calculator.

10. Move Y axis main stage +0.080 inch, control 118.

11. Refocus by moving Z-axis main stage, control 120.

12. Enter Y linear encoder 119 reading into STO 06 of calculator.

13. Enter Z linear encoder 122 reading into STO 07 of calculator.

14. Move Y axis main stage −0.080 inch, control 118.

15. Move X axis main stage +0.100 inch, control 103.

16. Enter X linear encoder 103 reading into STO 08 of calculator.

17. Enter Z linear encoder 122 reading into STO 09 of calculator.

18. Move X axis main stage −0.100 inch, control 103.

Steps 7-18 provide information to the calculator regarding non-parallelism of head 0 to the customer reference plane. The calculator will then determine compensation for non-parallelism.

19. Release lift device 125 so that head 1 is in contact with optic probe 50.

Figure 18:
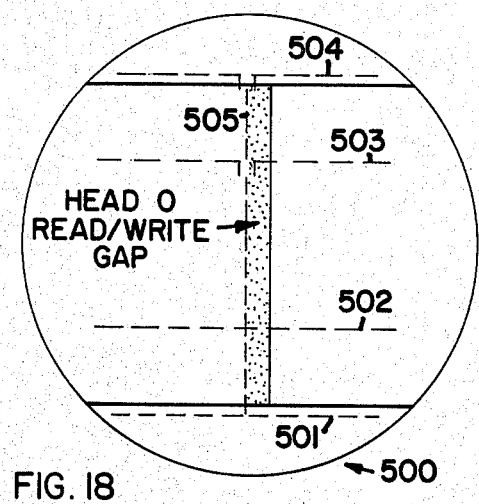

20. Adjust X-Y main stage controls 103, 118 until reticle and gap of head 0 are aligned as shown in FIG. 18; i.e., with read/write track centered with reticle lines 501 and 504 and edge of gap aligned with reticle line 505.

21. Enter X and Y linear encoders 105, 119 readouts in STO 20 and STO 21 of calculator.

22. Adjust internal focus assembly of channel 1 77-1 until read/write gap of head 1 comes into view, if necessary.

Figure 19:
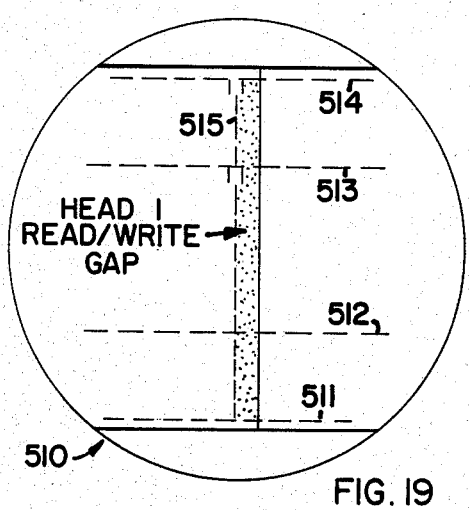

23. Adjust X and Y main stage controls 103, 118 and rotary encoder 170 until reticle and gap of head 1 are aligned as shown in FIG. 19. Again, with read/write track centered between 511 and 514 and gap edge aligned with 515.

24. Enter X linear encoder 105 readout value into STO 12 of calculator.

25. Enter Y linear encoder 119 readout value into STO 13 of calculator.

26. Enter rotary encoder readout value in STO 23 of calculator.

27. Bring tracking scope 101 into position and locate first target on upper arm flexure through aperture 36 on arm.

28. Adjust X-Y tracking stage controls 144, 151 until first target is centered in reticle of tracing scope.

29. Enter X linear encoder 146 readout for tracking scope in STO 14.

30. Enter Y linear encoder 146 readout for tracking scope in STO 15.

31. Adjust X-Y tracking stage controls 144, 151 until second target is centered in reticle of tracking scope.

32. Enter X linear encoder 146 readout for tracking scope in STO 26.

33. Enter Y linear encoder 152 readout for tracking scope in STO 27.

34. Lift upper arm with lift device 125.

35. Move Z axis main stage control 120 so there is 0.007 inch clearance between head 0 and optic probe 50.

36. Retract verification microscope 100 by means of X main stage coarse control 103.

37. Lower upper arm with lift device 125 until head 1 is free to comply with head 0. A 0.003 inch spacer should be used here to simulate a magnetic disk.

38. Move tracking scope X-Y and Z stages until first target is found.

39. Adjust X-Y tracking stage controls 144, 151 until first target is centered in reticle of tracking scope.

40. Enter X linear encoder 146 readout for tracking scope in STO 28.

41. Enter Y linear encoder 152 readout for tracking scope in STO 29.

42. Move tracking scope X-Y and Z stages until second target is found.

43. Adjust X-Y tracking stage controls 144, 151 until second target is centered in reticle of tracking scope.

44. Enter X linear encoder 146 readout for tracking scope in STO 30.

45. Enter Y linear encoder 152 readout for tracking scope in STO 31.

46. Move tracking scope out of work area.

47. Remove head assembly 10 from tooling plate 111.

SUMMARY OF MEASURED PARAMETERS

The following is a list summarizing the parameters measured in the above detailed calibration and verification procedures, identified for convenience by the same calculator storage register designation as in the preceding steps.

| Calculator Storage Register | | |
|---|---|---|
| STO 01 $Y_G$ | | Master block assembly - Y dimension (Measured) |
| STO 02 $X_G$ | | Master block assembly - X dimension |
| STO 03 $X_{P1}$ | | First X reading to determine parallelism of Head 0 |
| STO 04 $Y_{P1}$ | | First Y reading to determine parallelism of Head 0 |
| STO 05 $Z_{P1}$ | | First Z reading to determine parallelism of Head 0 |
| STO 06 $Y_{P2}$ | | Second Y reading to determine parallelism of Head 0 |
| STO 07 $Z_{P2}$ | | Second Z reading to determine parallelism of Head 0 |
| STO 08 $X_{P2}$ | | Second X reading to determine parallelism of Head 0 |
| STO 09 $Z_{P3}$ | | Third Z reading to determine parallelism of Head 0 |
| STO 12 $X_4$ | | X stage location with Head 1 in alignment with 1 reticle |
| STO 13 $Y_4$ | | Y stage location with Head 1 in alignment with 1 reticle |
| STO 14 $X_{0T1}$ | | X initial position first target |
| STO 15 $Y_{0T1}$ | | Y initial position first target |
| STO 16 a | | Dimension from FIG. 14a |
| STO 17 b | | Dimension from FIG. 14a |
| STO 18 d | | Dimension from FIG. 14b |
| STO 19 X' | | X distance, customer reference shaft 17 centerline to read/write gap centerline |
| STO 20 $X_3$ | | X stage location with head 0 in alignment with 0 reticle |
| STO 21 $Y_3$ | | Y stage location with head 0 in alignment with 0 reticle |
| STO 22 $X_{cm}$ | | X distance, customer master reference shaft centerline to scribe line $X_0$ |
| STO 23 $O_{RE}$ | | Azimuth angle input from rotary encoder |
| STO 24 $O_{IND}$ | | Induced azimuth error due to .250 inch lift |
| STO 25 $Y_{cm}$ | | Y distance, (customer master) reference surface 255 to scribe line 253. |
| STO 26 $X_{0T2}$ | | X initial position second target |
| STO 27 $Y_{0T2}$ | | Y initial position second target |
| STO 28 $X_{1T1}$ | | X final position first target |
| STO 29 $X_{1T1}$ | | Y final position first target |
| STO 30 $X_{1T2}$ | | X final position second target |
| STO 31 $Y_{1T2}$ | | Y final position second target |

CALCULATION OF MEASURED ALIGNMENT PARAMETERS

Based upon the above measurements, the following alignment parameters for the transducer assembly can be calculated. These calculated values can then be compared to the established tolerance for each quantity, to determine whether the particular transducer assembly under test meets alignment standards.

Calculation of $Y_{offset}$:

$$Y_{offset} = Y_G + Y_{0T1} - Y_{1T1} + Y_4 - Y_3 + \sqrt{a^2 + b^2} \, \text{SIN}\left[ \text{TAN}^{-1}\frac{a}{b} + \text{TAN}^{-1}\left( \frac{Z_{P2} - Z_{P1}}{Y_{P2} - Y_{P1}} \right) \right] - a$$

where:
$Y_G$ = Master block scribe line dimension from FIG. 9 (STO 01)
$Y_{0T1}$ = Y initial position of first target measured with tracking scope per step 28 of verification procedure (STO 15)
$Y_{1T1}$ = Y final position of first target measured with tracking scope per step 39 of verification procedure (STO 29)
$Y_4$ = Y stage location with head 1 in alignment per step 23 (STO 13).

$Y_3$ = Y stage location with head 0 in alignment per steps 20, 21 (STO 21).

a = Distance in Y direction from read/write track centerline to pivot point on flexure of head 1 FIG. 14a (STO 16)

b = Distance in Z direction from pivot point to recording surface of head 1 FIG. 14a (STO 17)

$Z_{P1}$ = First Z reading to determine parallelism of head 0 per steps 6 & 9 (STO 05).

$Z_{P2}$ = Second Z reading to determine parallelism of head 0 per steps 10, 11 and 13 (STO 07).

$Y_{P1}$ = First Y reading to determine parallelism of head 0 per steps 6 and 8 (STO 04)

$Y_{P2}$ = Second Y reading to determine parallelism of head 0 per steps 10, 11 and 12 (STO 06).

Calculation of $X_{offset}$ for head 1:

$$X_{offset\,1} = X' - X_{cm} + X_4 + X_G + X_{1T1} - X_{0T1} - \left\{ \sqrt{b^2 + d^2} \, \text{SIN} \left[ \text{TAN}^{-1} \frac{d}{b} + \text{TAN}^{-1} \left( \frac{Z_{P3} - Z_{P1}}{X_{P2} - X_{P1}} \right) \right] - d \right\}$$

where:

$X'$ = X distance customer reference shaft 17 centerline to read/write gap centerline FIG. 1 (STO 19)

$X_{cm}$ = X distance, customer master reference shaft centerline to scribe line 254 FIG. 10 (STO 22)

$X_4$ = X stage location with head 1 in alignment per steps 20,21 (STO 20).

$X_G = X_1-X_0$ from master block measurements FIG. 9 (STO 02).

$X_{1T1}$ = X final position of first target measured with tracking scope per steps 31 and 32 of verification procedure (STO 14)

$X_{0T1}$ = X initial position of first target measured with tracking scope per steps 28 & 29 of verification procedure (STO 14).

b = Distance in Z direction from pivot point to recording surface of head 1 FIG. 14b (STO 17)

d = Distance in X direction from read/write gap centerline to pivot point on flexure of head 1 FIG. 14b (STO 18)

$Z_{P3}$ = Third Z reading to determine parallelism of head 0 per steps 7 thru 18 (STO 09).

$Z_{P1}$ = First Z reading to determine parallelism of head 0 per steps 7 thru 18 (STO 05).

$X_{P2}$ = Second X reading to determine parallelism of head 0 per steps 7 thru 18 (STO 08).

$X_{P1}$ = First X reading to determine parallelism of head 0 per steps 7 thru 18 (STO 03)

Calculation of $X_{offset}$ for head 0:

$$X_{offset\,0} = X' - X_{cm} - X_3$$

where:

$X'$ = X distance customer reference shaft centerline to read/write gap centerline FIG. 1 (STO 19).

$X_{cm}$ = X distance, customer master reference shaft centerline to scribe line 254 FIG. 10 (STO 22).

$X_3$ = X stage location with head 0 in alignment per steps 20 and 21 (STO 20).

Calculation of Azimuth Angle, theta, for head 1:

$$\theta_1 = \theta_{RE} - \text{TAN}^{-1}\left(\frac{X_{0T2} - X_{0T1}}{Y_{0T2} - Y_{0T1}}\right) + \text{TAN}^{-1}\left(\frac{X_{1T2} - X_{1T1}}{Y_{1T2} - Y_{1T1}}\right)$$

where:

$\theta_{RE}$ = Angular input from rotary encoder (STO 23).

$X_{0T2}$ = X initial position of second target measured with tracking scope per steps 31 and 32 of verification procedure (STO 26)

$X_{0T1}$ = X initial position of first target measured with tracking scope per steps 28 and 29 of verification procedure (STO 14).

$Y_{0T2}$ = Y initial position of second target measured with tracking scope per steps 31 and 33 of verification procedure (STO 27).

$Y_{0T1}$ = Y initial position of first target measured with tracking scope per steps 28 and 30 of verification procedure (STO 15)

$X_{1T2}$ = X final position of second target measured with tracking scope per steps 43 and 44 of verification procedure (STO 30).

$X_{1T1}$ = X final position of first target measured with tracking scope per steps 39 and 40 of verification procedure (STO 28).

$Y_{1T2}$ = Y final position of second target measured with tracking scope per steps 43 and 45 of verification procedure (STO 31).

$Y_{1T1}$ = Y final position of first target measured with tracking scope per steps 39 and 41 of verification procedure (STO 29).

It will thus be appreciated that this invention provides an accurate apparatus and method for verifying alignment of read/write head gaps and a magnetic transducer assembly of the type for use on magnetic disk recording media. The measurement is based upon direct optical observation of positions, with measurement and compensation for possible sources of error due to the insertion of the optical probe in the head assembly, as opposed to the indirect method used in the prior art of mounting the head assembly under test on a disk drive and playing a reference diskette, wherein errors in either the disk drive or the reference diskette can add to, and be indistinguishable from any alignment errors in the heads of the transducer itself. The apparatus and method thus provides direct and repeatable verification of the important head alignment parameters.

What is claimed is:

1. Apparatus for optical verification of head alignment for floppy disk transducer assemblies, comprising:

an optical probe having spaced parallel transparent viewing surfaces on opposite sides thereof and having a thickness between said surfaces small enough to permit insertion of the probe between opposing heads of a transducer assembly, said probe including image transmission and reflection means for transmitting images of transducer heads objects adjacent said viewing surfaces through the probe to end portions thereof;

optical path means positioned to receive said images transmitted from end portions of said probe, and operative to provide magnified images of the transducer heads objects adjacent said viewing surfaces for visual inspection thereof;

means for supporting a transducer assembly to be inspected with the heads thereof adjacent said viewing surfaces of said probe;

means for providing relative movement between said optical probe and said transducer assembly supporting means;

means for measurement of the relative positions of the read/write gaps of transducer heads positioned adjacent opposite sides of said probe by measuring the amount of relative movement of said probe and transducer assembly supporting means required to bring said gaps into predetermined alignment in said optical path means; and an optical tracking scope and means positioning it in alignment with said transducer supporting means for observation and measurement of movement of the transducer heads caused by opening of the transducer assembly to receive the optical probe.

2. Apparatus for optical verification of head alignment for floppy disk transducer assembly, comprising:

an inspection microscope having two optical paths with eyepieces spaced for independent viewing, reticles, focusing means, an objective probe and optical means for converging the two independent optical paths towards each other towards said objective probe;

said objective probe having space parallel transparent viewing surfaces on opposite sides thereof and have a thickness between said surfaces small enough to permit insertion of the probe between opposing heads of a transducer assembly, said probe including image transmission and reflection means for transmitting images of the transducer heads adjacent said viewing surfaces to the probe to and in alignment with said optical paths of said inspection microscope, said inspection microscope providing magnified images of the faces of said transducer heads at said reticles and eyepieces for measurement thereof; and an optical tracking scope and means positioning it in alignment for optical observation of the transducer or transducer mounting flexure of a lift arm of a transducer assembly to be verified and means for measurement of movements thereof due to lift of the lift arm.

3. Apparatus according to claim 2 further including means for providing relative movement of said tracking microscope with respect to said transducer assembly, and means for measuring the amount of movement thereof, whereby movement of a transducer head to receive said probe can be measured.

4. Apparatus for optical verification of head alignment for double sided floppy disk transducer assemblies of the type in which at least one head is mounted on a lift arm movable away from the other head for insertion and removal of a diskette and movable toward the other head to a use position with a diskette between the heads, comprising:

means for supporting a transducer assembly to be inspected;

an inspection microscope including an objective probe having spaced parallel viewing surfaces on opposite sides thereof and having a thickness permitting insertion of the probe between the opposing heads of a transducer assembly with the viewing surfaces adjacent and opposing the faces of the heads of the assembly, and optical means for providing magnified images of said head faces adjacent said viewing surfaces of said probe, for visual inspection thereof, including reticle means for measurement of the positions of the gaps of said transducer heads; and an optical tracking scope and means mounting it for observation of movement of the head on the lift arm of the assembly due to opening of the lift arm to receive the objective probe.

5. Optical verification apparatus according to claim 4 further including means for providing measured relative movement between said probe and said transducer assembly for providing measurement of head alignment parameters.

6. Optical verification apparatus according to claim 4 including means for providing measured relative movement of said optical tracking scope with respect to said transducer supporting means for providing a measure of said movement of the lift arm mounted head.

7. Optical verification apparatus according to claim 4 wherein said probe has guard bands adjacent viewing surfaces to protect them from damage by contact with the heads of said transducer assembly.

8. Optical verification apparatus according to claim 4 further including an optical measurement device aligned with said objective probe and the head of a transducer assembly for measuring the gap therebetween, and means for adjusting the spacing between the transducer head and the viewing surface of the probe, for permitting adjustment to a predetermined gap for proper focus on the head.

9. Apparatus for optical verification of head alignment for double sided floppy disk transducer assemblies of the type in which at least one head is mounted on a lift arm movable away from the other head for insertion and removal of a diskette and movable towards the other head to a use position with a diskette between the heads, comprising:

an inspection microscope including an objective probe having spaced parallel viewing surfaces on opposite sides thereof and having a thickness permitting insertion of the probe between the opposing heads of the transducer assembly with the viewing surfaces adjacent and opposing the faces of the heads of the assembly, and optical means for providing magnified images of said head faces adjacent said viewing surfaces of said probe for visual inspection thereof, including reticle means for measurement of the positions of the read/write gaps of said transducer heads;

means for supporting a transducer assembly to be inspected adjacent said objective probe;

means for providing relative movements between said probe and said transducer supporting means in three mutually orthogonal axes, said movements permitting insertion of said objective probe between the heads of the transducer assembly when the lift arm is moved away from the other head to receive the probe;

an optical tracking scope and means positioning it in alignment with said transducer supporting assembly for observation of the lift arm-mounted head or the mounting flexure thereof for observation and measurement of the position thereof prior to and subsequent to lifting of the lift arm to insert the objective probe; and means for measuring movements of said movement means whereby alignment of said heads can be determined by measuring movements required to align the read/write gaps of said heads with predetermined positions on said reticle means.

10. Apparatus according to claim 9 including a calibration gauge block having an opening to receive said objective probe and having reference marks within said opening adjacent said viewing surfaces when the probe is in the opening, means for supporting said calibration gauge block on said supporting means adjacent said objective probe, and means for adjusting the position of the reticle of at least one of said optical paths to calibrate said inspection microscope to said gauge block.

11. Apparatus according to claim 4 further including a reference block configured to fit in said transducer assembly supporting means and having reference marks thereon according to a predetermined location for the read/write gap of one of the transducers with respect to the transducer assembly, whereby the reference block can be mounted in said supporting means and observed through said inspection microscope to permit calibration of the apparatus to said predetermined location for said one of said transducer heads.

12. Apparatus according to claim 9 further including an optical micrometer aligned with said objective probe and the head of a transducer assembly when positioned in said transducer assembly supporting means for measuring the gap therebetween whereby the spacing between the probe and the transducer can be adjusted to a predetermined distance for proper focus of the inspection microscope.

13. Apparatus according to claim 9 wherein said optical path means includes a rotary positioning device for at least one of said reticle means, and measurement means therefor whereby azimuth errors of a transducer can be measured.

14. A method of measuring alignment of a magnetic disk transducer assembly having a pair of opposed transducers, comprising the steps of:

inserting between the transducers an optic probe having a pair of optical paths for viewing the respective opposing read/write gaps of the transducer;

measuring relative movement of the transducers caused by moving them apart to receive the probe by observing the change of position of one of the transducers caused by insertion of the probe with a tracking scope;

positioning the transducer assembly and probe to a known position relative to each other by observing the read/write gap of one of the transducers through one of the optical paths of the optic probe;

measuring the position of the read/write gap of the other of the transducers with respect to the known position by observation thereof through the other of the optical paths of the optic probe; and calculating the alignment of the two transducers by taking the difference between said position measurement and said relative movement measurement.

* * * * *